US008053926B2

(12) United States Patent
Lehmann et al.

(10) Patent No.: US 8,053,926 B2
(45) Date of Patent: Nov. 8, 2011

(54) METHODS AND SYSTEMS FOR MANAGING FACILITY POWER AND COOLING

(75) Inventors: Gert Lehmann, Vejle (DK); Mikkel Dalgas, Sjoelund (DK); Flemming Nicolas Harms, Vejle (DK)

(73) Assignee: American Power Conversion Corporation, West Kingston, RI (US)

( * ) Notice: Subject to any disclaimer, the term of this patent is extended or adjusted under 35 U.S.C. 154(b) by 655 days.

(21) Appl. No.: 12/140,187

(22) Filed: Jun. 16, 2008

(65) Prior Publication Data

US 2009/0309570 A1 Dec. 17, 2009

(51) Int. Cl.
H02J 9/00 (2006.01)
(52) U.S. Cl. ........................................ 307/64
(58) Field of Classification Search .............. 307/64–66; 713/320, 300; 708/445
See application file for complete search history.

(56) References Cited

U.S. PATENT DOCUMENTS

| | | | |
|---|---|---|---|
| 4,665,322 A | | 5/1987 | Eishima et al. |
| 5,065,133 A | * | 11/1991 | Howard .................. 375/258 |
| 5,311,419 A | | 5/1994 | Shires |
| 5,315,531 A | * | 5/1994 | Oravetz et al. .................. 702/62 |
| 5,465,011 A | | 11/1995 | Miller et al. |
| 5,559,704 A | * | 9/1996 | Vanek et al. .................. 701/99 |
| 5,654,591 A | | 8/1997 | Mabboux et al. |
| 5,684,686 A | | 11/1997 | Reddy |
| 5,764,503 A | | 6/1998 | Brand et al. |
| 6,177,884 B1 | | 1/2001 | Hunt et al. |
| 6,191,500 B1 | | 2/2001 | Toy |
| 6,317,346 B1 | | 11/2001 | Early |
| 6,538,796 B1 | * | 3/2003 | Swanson ....................... 359/291 |
| 6,838,925 B1 | | 1/2005 | Nielsen |
| 6,847,130 B1 | * | 1/2005 | Belehradek et al. ............. 307/66 |
| 6,906,933 B2 | | 6/2005 | Taimela |
| 6,925,573 B2 | | 8/2005 | Bodas |
| 6,940,187 B2 | | 9/2005 | Escobar et al. |
| 7,005,759 B2 | | 2/2006 | Ying et al. |
| 7,050,312 B2 | | 5/2006 | Tracy et al. |
| 2002/0072868 A1 | | 6/2002 | Bartone et al. |
| 2002/0116139 A1 | | 8/2002 | Przydatek et al. |

(Continued)

FOREIGN PATENT DOCUMENTS

EP 1777607 A1 4/2007

OTHER PUBLICATIONS

International Search Report and Written Opinion PCT/US2009/044326 mailed Mar. 24, 2010.

(Continued)

*Primary Examiner* — Albert W Paladini
(74) *Attorney, Agent, or Firm* — Lando & Anastasi, LLP

(57) ABSTRACT

A method and corresponding apparatus provide a determination of available power capacity of a phase of a power supply in a data center rack. The method includes metering the power of a power supply and calculating an average peak power draw per phase of the power supply. Using average peak power draw per phase of the power supply and the expected power draw data corresponding to data center equipment coupled to the power supply, the available power capacity can be calculated on a per phase of the power supply. A method and corresponding apparatus for managing data center equipment may use the phase based available power capacity calculations to determine the optimal placement of new data center equipment within a data center configuration.

22 Claims, 17 Drawing Sheets

U.S. PATENT DOCUMENTS

| | | |
|---|---|---|
| 2003/0048005 A1 | 3/2003 | Goldin et al. |
| 2005/0162019 A1 | 7/2005 | Masciarelli et al. |
| 2005/0168073 A1 | 8/2005 | Hjort |
| 2005/0278075 A1 | 12/2005 | Rasmussen et al. |
| 2006/0043792 A1 | 3/2006 | Hjort et al. |
| 2006/0043793 A1 | 3/2006 | Hjort et al. |
| 2006/0043797 A1 | 3/2006 | Hjort et al. |
| 2006/0044846 A1 | 3/2006 | Hjort et al. |
| 2006/0072262 A1 | 4/2006 | Paik et al. |
| 2006/0206730 A1 | 9/2006 | Cartes et al. |
| 2006/0279970 A1 | 12/2006 | Kernahan |
| 2007/0055409 A1 | 3/2007 | Rasmussen et al. |
| 2007/0064363 A1 | 3/2007 | Nielsen et al. |
| 2007/0228837 A1 | 10/2007 | Nielsen et al. |
| 2007/0291430 A1 | 12/2007 | Spitaels et al. |
| 2008/0042491 A1 | 2/2008 | Klikic et al. |
| 2008/0157601 A1 | 7/2008 | Masciarelli et al. |
| 2008/0197706 A1 | 8/2008 | Nielsen |
| 2009/0039706 A1 | 2/2009 | Kotlyar et al. |
| 2009/0046415 A1 | 2/2009 | Rasmussen et al. |

OTHER PUBLICATIONS

Notification Concerning Transmittal of International Preliminary Report on Patentability from corresponding PCT application PCT/US2009/044326, mailed Dec. 29, 2010.

* cited by examiner

120A / 108A

| | |
|---|---|
| 122 Rack No. | A1 |
| 124 Rack Type: | Server Rack |
| 126 Power Capacity, Position 1: | 10 kW |
| 128 Power Used, Position 1: | 60% |
| 130 Cooling Capacity, Position 1: | 8 kW |
| 132 Cooling Used, Position 1: | 75% |
| 136 Power Redundancy, Position 1: | 2N |
| 138 Cooling Redundancy, Position 1: | N+1 |
| 140 UPS Runtime, Position 1: | 10 Minutes |

⋮

134 Contents of Rack:
_____
_____
_____

| | |
|---|---|
| 122 Rack No. | B1 |
| 124 Rack Type: | Server Rack |
| 126 Power Capacity, Position 1: | 10 kW |
| 128 Power Used, Position 1: | 40% |
| 130 Cooling Capacity, Position 1: | 5 kW |
| 132 Cooling Used, Position 1: | 80% |
| 136 Power Redundancy, Position 1: | 2N |
| 138 Cooling Redundancy, Position 1: | N+1 |
| 140 UPS Runtime, Position 1: | 10 Minutes |

⋮

134 Contents of Rack:
_____
_____
_____

FIG. 6B

Properties for Group 1

☐ type filter text

☐ Capacity Options
☐ Tags

Capacity Options

Identify
Name: Group 1
Color: ☐ Change Color

Group Power Options
Power Feed: N2 Feed ▼ (N2 Feed)
Internal Redundancy: N ▼ (N)

Power Draw
Peak Power Draw (per rack): 8 kW
Average Power Draw (per rack): 5 kW (7.5 kW)
Total planned power draw: 10 kW
Group draw description: Suitable for typical deployment of servers. Can be cooled with IR cooling or by traditional raised-floor cooling combined with rack-mounted air moving units.

▼ Advanced Phase Configuration

|  | L1 | L2 | L3 |
|---|---|---|---|
| Peak: | 6 | 6 | 0 kW |
| Recommended Peak: | 6.0 | 6.0 | NA kW |
| Average: | 3.75 | 3.75 | 0 kW |
| Recommended Average: | 3.8 | 3.8 | NA kW |

[OK]  [Cancel]

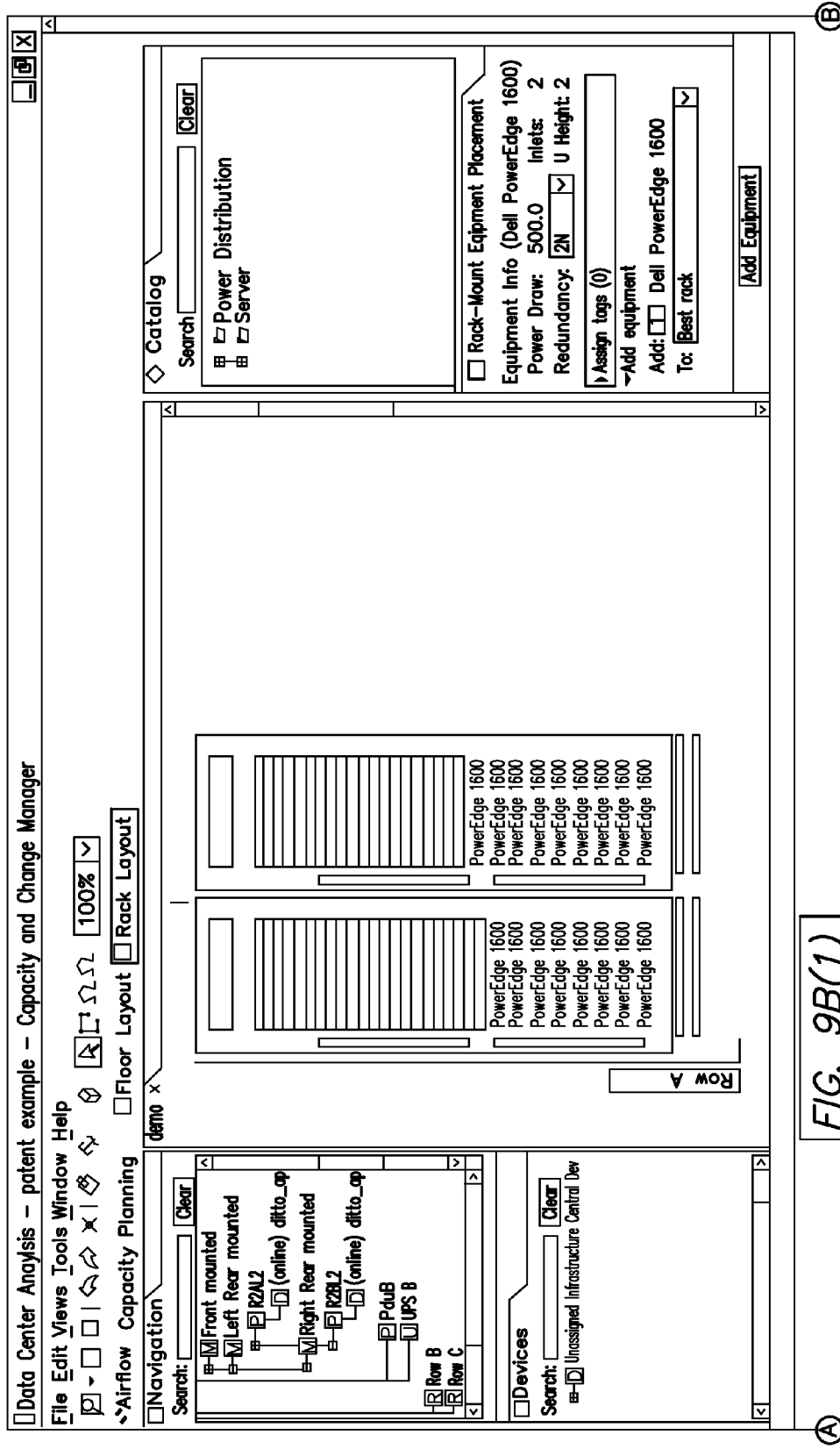
FIG. 9B(1)

| Item ▲ | Location | Phase | UPS used capa... | UPS reserved C... | Distribution us... | Distribution res... | Distribution ca... | Distribution res... |
|---|---|---|---|---|---|---|---|---|
| ⊟ UPS/A | UPS A/demo | | 11.5 kW | 15 kW | | | | |
| ⊟ PduA | PduA/demo | | | | 37.5% | 15 kW | 11.5 kW | 25 kW |
| ⊞ R1AL1 | U–40/R1/demo | L1 | | | | | | |
| ⊞ R1AL2 | Left-rear/R1/demo | L2 | | | | | | |
| ⊞ R2AL1 | U–40/R2/demo | L1 | | | | | | |
| ⊞ R2AL2 | Left-rear/R2/demo | L2 | | | | | | |
| ⊟ UPS B | UPS B/demo | | 11.5 kW | 15 kW | | | | |
| ⊟ PduB | PduB/demo | | | | 37.5% | 15 kW | 11.5 kW | 25 kW |
| ⊞ R1BL1 | U–39/R1/demo | L1 | | | | | | |
| ⊞ R1BL2 | Right-rear/R1/demo | L2 | | | | | | |
| ⊞ R2BL1 | U–39/R2/demo | L1 | | | | | | |
| ⊞ R2BL2 | Right-rear/R2/demo | L2 | | | | | | |

User: apc    Server: IS9.215.175.59

*FIG. 9B(2)*

METHODS AND SYSTEMS FOR MANAGING FACILITY POWER AND COOLING

BACKGROUND OF INVENTION

1. Field of Invention

Embodiments of the invention relate generally to entity management, and more specifically to methods and systems for managing facility power.

2. Discussion of Related Art

Centralized data centers for computer, communications and other electronic equipment have been in use for a number of years, and more recently with the increasing use of the Internet, large scale data centers that provide hosting services for Internet Service Providers (ISPs), Application Service Providers (ASPs) and Internet content providers are becoming more prevalent. Typical centralized data centers contain numerous racks of equipment that require power, cooling and connections to external communications facilities. In modern data centers and network rooms, the increased density of computing equipment used in these facilities has put strains on the cooling and power systems of the facilities. In the past, typical power consumption for each equipment enclosure in a data facility was on the order of 1 kW. With the use of server blades and other high power density equipment in equipment racks, it is not uncommon for an equipment rack to have a power draw of 10 kW or even as high as 25 kW.

Several tools exist which enable a manager of a data center to monitor power usage in a facility. These tools include the InfrastruXure® Manager and/or InfrastruXure® Central product available from American Power Conversion Corporation of West Kingston, R.I.

Several tools are available to assist a data center designer in configuring a layout of a data center to provide necessary power and cooling to equipment to be located in the data center. These tools typically assist a designer in determining total power requirements and accordingly overall cooling requirements for a data center. In addition, these tools may assist a designer in determining optimum equipment layout and proper sizing of power cabling and circuit breakers.

SUMMARY OF INVENTION

In existing data centers, it is often desirable to replace equipment with upgraded equipment and/or add new equipment to existing enclosures in the facility. With the increasing power requirements of computer equipment, it is desirable for a data center manager to determine if there is adequate power available in the facility before new or replacement equipment may be added. Data center equipment is predominantly single-phase while the power distribution of larger data centers is three-phase.

Typically, a data center manager may know, or can determine, if the total power capacity of the data center is sufficient for the total power draw. However, the complexity of the distribution system and the fact that the load varies over time makes it difficult for individuals to manually distribute the load accurately between multiple phases. Overloading a phase of a power supply, such as a power distribution unit (PDU) or uninterruptible power supply (UPS), can lead to loss of the secure power from the power supply or cause breakers to trip, thereby dropping the load.

In the past, when replacing equipment or adding new equipment, data center managers may have simply employed a trial and error methodology by manually plugging in a server, turning it on, and seeing if the circuit breaker trips due to an overload, with an unfortunate result of loss of power to an entire rack of servers. Alternatively, they may have connected equipment after evaluating the current load at the power supply. This approach also exposes the system to a potential loss of power to an entire rack if the data equipment connected to the power supply scale up in power consumption over time. Other approaches include relying on the equipment manufacturers' reported calculated power consumption data or specifications and assuming even distribution of the power load between phases on a power supply, or dramatically oversizing the distribution and power systems to reduce the effect phase balancing may be imprecise, inefficient, and expensive.

Aspects of the present invention relate generally to management of data center entities and their associated resources. A method and corresponding apparatus provide a determination of available power capacity of a phase of a power supply in a data center rack. The method includes metering the power of a power supply and calculating an average peak power draw per phase of the power supply. Using average peak power draw per phase of the power supply and the expected power draw data corresponding to data center equipment coupled to the power supply, the available power capacity can be calculated on a per phase of the power supply. A method and corresponding apparatus for managing data center equipment may use the phase based available power capacity calculations to determine the optimal placement of new data center equipment within a data center configuration.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 6A and 6B are diagrams showing additional information that may be displayed using embodiments of the invention;

FIG. 8 is a diagram showing additional information that may be displayed using other embodiments of the invention;

FIGS. 9A and 9B show graphical user interface screens that exhibit various aspects of the present invention that may be used with information displayed in FIG. 8;

DETAILED DESCRIPTION

Figure 1:
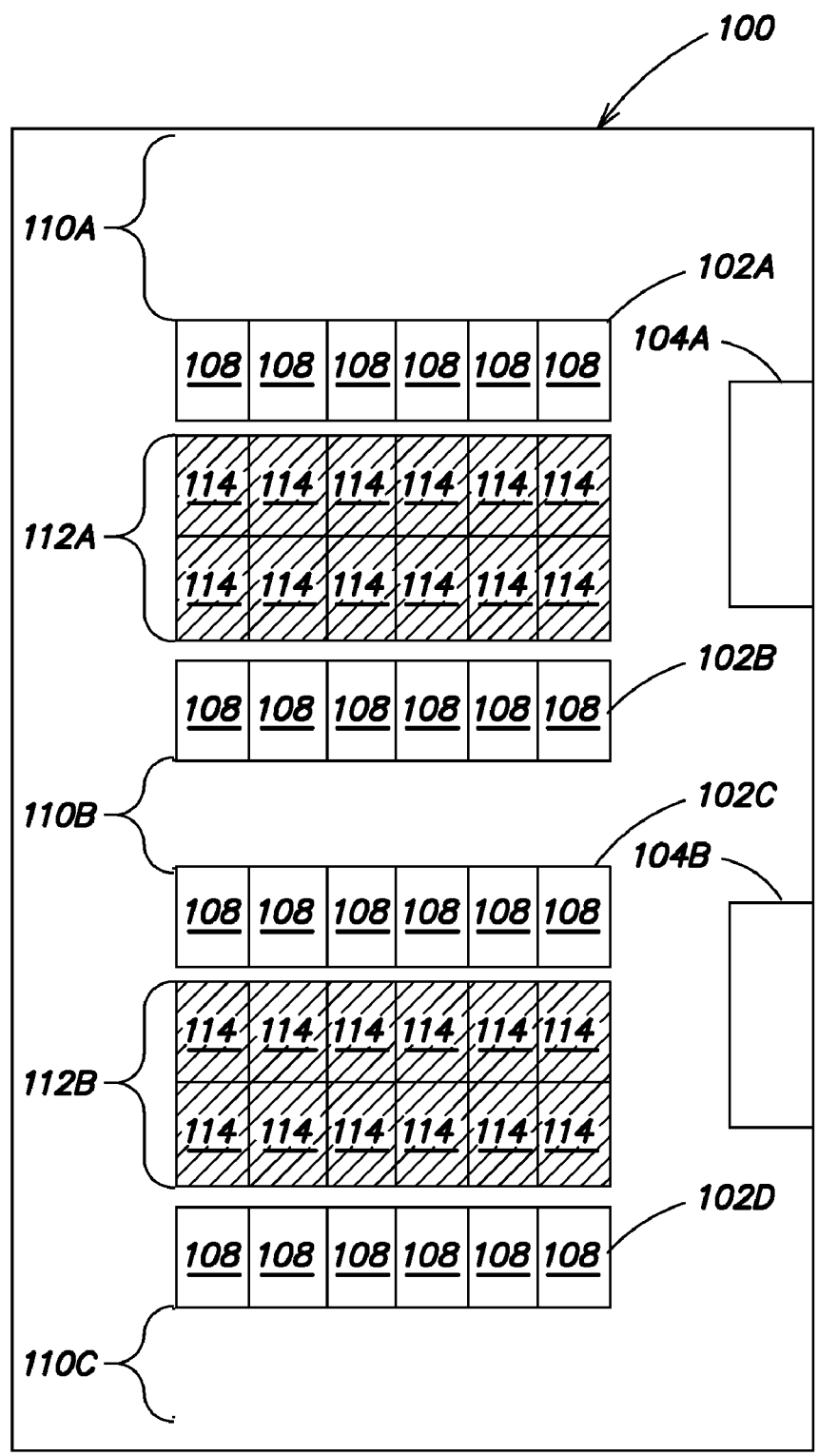
FIG. 1 is a top view of a data center of the type with which embodiments of the present invention may be used.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 2:
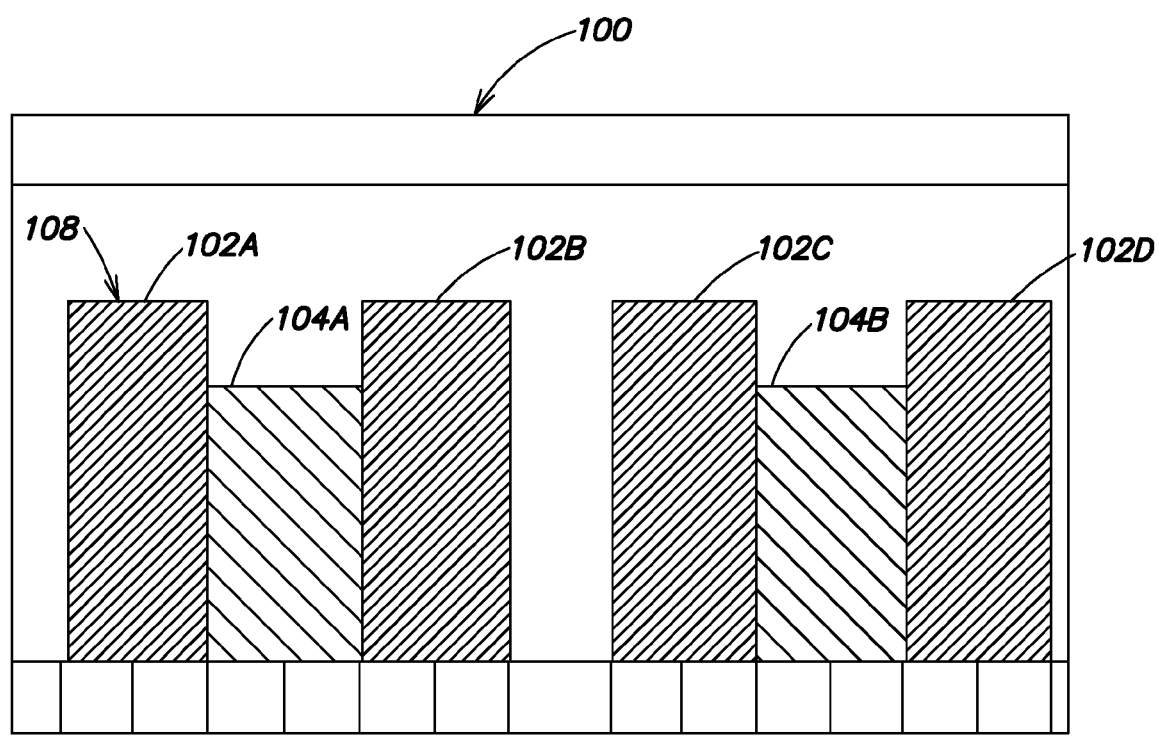
FIG. 2 is a side view of the data center of FIG. 1.

Embodiments of the present invention may be used to design, manage and retrofit a data center, such as data center 100 which is shown in FIGS. 1 and 2 with FIG. 1 showing a top view of the data center 100, and FIG. 2 showing a side view of the data center 100. As discussed further below, the design of the layout of the data center 100, including various data center resources such as power and cooling considerations may be performed using systems and processes of embodiments of the present invention. A data center resource may include, for example, any characteristic of a data center that supports and/or ensures data center equipment functionality. Examples of data center resources include power, cooling, physical space, weight support, remote equipment control capability, physical and logical security and physical and logical network connectivity. Power data center resources may include power distribution resources, such as transformers, PDUs and outlets, and power available for distribution, such as utility power supplied to the data center, power generated by an onsite generator and power supplied by UPSs. Physical space resources in a data center may include data center floor space and rack U space. Cooling resources in a data center may include cooling distribution capacity and cooling generation capacity. Physical security resources in a data center may include security cameras and door locks. Logical network connectivity resources in a data center may include Virtual Local Area Networks, Domain Name Services, and Dynamic Host Configuration Protocol Services. Physical network connectivity resources may include network cabling and patch panels. Remote equipment control capability resources in a data center may include Keyboard Video Mouse services.

Embodiments of the invention, however, are not limited for use with data centers like that shown in FIGS. 1 and 2 and may be used with other facilities that do not include raised floors and may be used with facilities that house equipment other than computing equipment, including telecommunications facilities and other facilities. Further, embodiments of the invention may be used with raised floor and equipment layouts that are not neatly arranged in the manner shown in FIGS. 1 and 2. Embodiments of the present invention may use systems, devices and methods described in U.S. patent application Ser. No. 10/038,106, filed Jan. 2, 2002, titled "Rack Power System and Method," incorporated herein in its entirety by reference.

The data center 100 includes rows of racks 102A, 102B, 102C and 102D, cooling units 104A and 104B, and a raised floor 106. Each of the rows includes racks 108, at least a number of which draw cool air from the front of the rack and return warm air to the rear or top or rear and top of the rack. Each rack may contain U space positions designed to house rack mounted data center equipment, such as, for example, servers, cooling equipment and network connectivity equipment.

Figure 3:
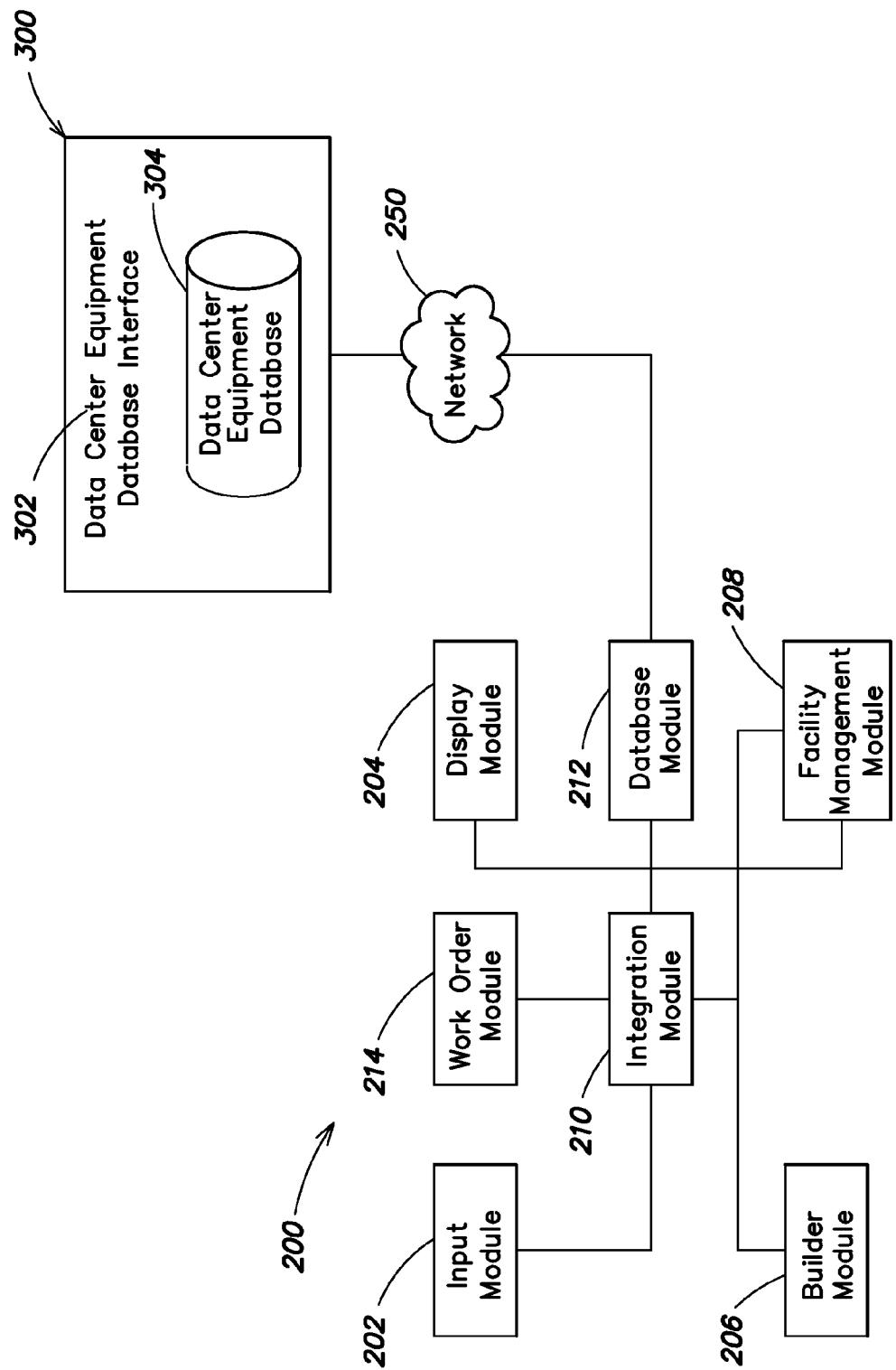
FIG. 3 is a functional block diagram of a system in accordance with one embodiment of the present invention.

FIG. 3 is a functional block diagram of a system for designing, monitoring, and upgrading equipment installed in a data center, such as data center 100 of FIG. 1, in which principles of the invention may be employed. This equipment may include rack mounted equipment, such as servers, storage devices, and network connectivity equipment, and floor mounted equipment, such as three phase power distribution units and CRACs. FIG. 3 shows a functional block diagram of a design and management system 200. Embodiments of the invention are not limited to the functions provided by the functional blocks or the particular arrangement of the blocks. In addition, the functions provided by the system 200 need not be implemented on one computer system, but rather may be implemented using a number of networked devices as described further below that provide the functions described. Further, particular embodiments may have more or less functions and functional modules than those described below with reference to FIG. 3. In different embodiments, the functions described with reference to FIG. 3 may be performed on one processor or controller or may be distributed across a number of different devices.

The system 200 includes an input module 202, a display module 204, a builder module 206, a facility management module 208, an integration module 210, a database module 212, and a work order module 218. The input module 202 provides an interface to allow users to enter data into the system 200. The input module 202 may include, for example, one of a number of known user input devices for computer systems, and in addition, in at least one embodiment, electronic data regarding a facility and/or equipment to be loaded into a facility may be entered into the system through a network interface or using an electronic media storage reader. Information may flow between these modules using any technique known in the art. Such techniques include passing the information over the network via TCP/IP, passing the information between modules in memory and passing the information by writing to a file, database, or other storage entity, such as a storage device, disk or other type of storage entity.

The display module 204 includes a display interface and may include a graphical display to display output data to a user. In addition, the display module 204 may include an interface for one or more printers that provide a hard copy of output data. In some embodiments, the display interface may communicate through a network connection and the display may be remotely located. In some embodiments, the display interface may be placed on the data center equipment.

The builder module 206 includes routines for designing optimal layout of equipment in a facility, determining data center resource requirements, such as power requirements and cooling requirements, for electronic enclosures and/or equipment racks, ensuring that the placement of equipment, cooling units and power distribution branches in the facility allow the data center resource requirements, such as power and cooling requirements, to be met, and calculating for each electronic enclosure, and/or equipment rack, the remaining data center resource capacity, such as power capacity and cooling capacity, available based on the layout of equipment in the facility.

In another embodiment, builder module 206 exposes interfaces that allow for entry of data center resource supply policies. These policies may detail additional desired characteristics of the data center resources as supplied to data center equipment. For example, data center resource supply policies may specify desired data center resource redundancy levels and runtime requirements. Additionally, data center resource supply policies may specify security needs for data center equipment, such as, for example, the need to locate servers with financial data in racks that may be locked and/or under surveillance.

The facility management module 208 is used by the system 200 after equipment is installed in the facility. The management module includes routines to monitor data center resource characteristics, such as power and cooling characteristics, of equipment in a facility. The management module may be coupled, either directly or through one or more networks, to measurement devices and control devices throughout the facility and may record their history for analysis, summarization and exportation.

According to one embodiment, the integration module 210 is the main module in the system and coordinates flow of data in the system to perform methods of embodiments of the present invention.

The database module 212 is used to store data regarding various devices that may be used in a data center, such as servers, uninterruptible power supplies, power strips, network connectivity equipment (such as network cabling, hubs, routers, wireless routers, switches, patch panels, etc.), automatic transfer switches, power distribution units, air conditioning units, racks and any other data center equipment. The data stored may include data center resource supply policies for data center equipment. The data stored may also include data center resource consumption and production benchmarks for data center equipment such as physical parameters (e.g., dimensions/rack space requirements, power plug types, network cabling specifications, etc.) as well as power and cooling consumption data. In the case of data center equipment that provide data center resources such as network connectivity equipment, power supplies and air conditioning units, data center resource production benchmarks may include network connectivity, cooling and power output characteristics (e.g. total output capacity, number and type of connections/plugs available, etc.). It should be appreciated that benchmarks may indicate that certain data center equipment produce, and/or consume, data center resources. Examples of data center resource providing equipment include electrical generators and CRACs, among others. As described below, the database module may be used in embodiments of the invention to provide a complete bill of materials (BOM) for a completed design. In one embodiment, a centralized web-accessible database server may be used to store equipment information and warnings and error messages, allowing easy access to the information for editing.

In another embodiment, a user may maintain data center equipment information, such as the information handled by database module 212, with the assistance of equipment database system 300. Equipment database system 300 is also depicted in functional block diagram FIG. 3. In the embodiment illustrated in FIG. 3, system 300 communicates with the design and management system 200 through a network 250. System 300, which may be hosted by the system provider, includes data center equipment database 304 and data center equipment database interface 302. In general, interface 302 may be an interface to database 304 that may receive or provide any data appropriate for storage in database 304 including data center configuration, equipment or resource information. Database 304, in turn, may receive and store from interface 302 or retrieve and provide to interface 302 data center information including data center equipment resource requirements, data center configurations and data center resource redundancy and runtime requirements.

Database 304 may serve as a master database for the system provider and thus may include several types of information related to data centers. In one embodiment, database 304 includes a data center configuration management database (CMDB), which may include one or more specific data center physical and logical configurations, and a data center equipment characteristics database, which may include theoretical and actual data center resource production and consumption information for data center equipment. More particularly, database 304 may accept and store specific CMDB information for the system provider's installed base of data centers or a subset thereof. This information may include the entire physical layout of a data center, e.g. its physical dimensions, the location and identity of data center equipment, and data center resource capacity, redundancy and runtime requirements, among other information that may have relevance to the design and performance of a data center. The source of this information may include the initial design on the data center as discussed below in connection with the method 400 of FIG. 4.

The type of information stored by database 304 for data center equipment characteristics may include the information discussed above with regard to database module 212, e.g. nameplate values as referred to in the art. Additionally, database 304 may also store data center resource consumption and production history for data center equipment and may use this information to maintain a set of benchmarks that are specific to the manufacturer and model of data center equipment. These specific historical measurements may be summarized into various forms to establish a benchmark that is specific to the manufacturer and model of data center equipment and that is based on actual, practical usage of the data center equipment rather than theoretical values (e.g. nameplate values). These data center resource consumption and production summaries may include, among others, minimum, maximum and average data center resource consumption or production, data center resource consumption or production as a function of time, e.g. power or cooling consumption or production by day of week, week of year, etc., actual data center resource consumption or production when a change in either is requested, and data center resource consumption or production as a function of data center equipment utilization. The source of this information may include the initial design on the data center, including customer or system provider entered benchmarks, and ongoing parameter measurement as discussed with regard to method 400 below. According to one aspect, it is appreciated that these benchmarks, in turn, may be more accurate than the nameplate values and may be used for simulation purposes during the design and retrofitting processes discussed below.

Interface 302 may expose both user interfaces (UIs) and system interfaces to exchange database 304 information with external entities. These external entities may include systems and/or users. Interface 302 may both restrict input to a predefined information domain and validate any information entered prior to using the information or supplying the information to other modules. For instance, in one embodiment, interface 302 may include a Structured Query Language (SQL) interface to enable a user or application program to interrogate database 304. This SQL interface may include graphical elements that a user may actuate to build SQL statements and may also include elements that enable a user to simply input SQL statement directly.

In other embodiments, interface 302 may include more complex grouping, translation, validation and/or restriction logic. For instance, interface 302 may validate that a SQL statement entered by a user conforms to proper SQL syntax prior to executing it against database 304. In one embodiment, interface 302 may expose a UI with characteristics similar to those of builder module 206 to enable users to create database information representing various data center configurations. In another example, interface 302 may expose a user interface allowing a user to enter new data center equipment resource information, including manufacturer, model and data center resource consumption and production benchmarks. Interface 302 may restrict entry of resource consumption and production benchmarks to predefined data center resources, such as power, cooling, physical space, etc. In still another embodiment, a user may establish groups of data center equipment through interface 302 and approve these equipment groups for use within a set of data centers or upon certain types of computing devices, such as a mobile computing device. Furthermore, interface 302 may enable a user to designate a hierarchical relationship between groups of equipment. As discussed further in regard to FIG. 3 below, arrangement of this information into a hierarchy of groups may ease database maintenance and distribution.

In one embodiment, interface 302 may expose a system interface that imports data center configuration and measured parameter information from a system provider's installed base of data centers or data center equipment providers. Interface 302 may utilize a standard protocol, such as, for example, SQL or SQL wrapped in SOAP, to implement such a system interface and may include non-standard protocol elements that are parsed and resolved to commands to be executed by database 304. Interface 302 may validate database commands prior to execution on database 304. Any customer specific data center equipment, e.g. data center equipment entered by a customer that is not present in the database 304, may be imported into database 304 by interface 302 if any applicable validation is successful. Similarly, equipment not present in database 304 that is made available by data center equipment providers may be imported into database 304 by interface 302 if any applicable validation is successful. These features enable system 300 to easily add new data center equipment to its set of managed elements.

Furthermore, importation of measure parameters may trigger a parameter summarization process that updates data center equipment resource consumption and production benchmarks to reflect actual usage history. The summarization process may include updating, among others, minimum, maximum and average power consumed or produced benchmarks, benchmarks for power consumption or production as a function of time, e.g. power consumed or produced by day of week, week of year, etc., benchmarks for power actually consumed or produced when a change in either is requested, and/or benchmarks for power consumed or produced as a function of data center equipment utilization.

In still another embodiment, interface 302 may expose a system interface that exports data center equipment information, or catalogs, to external storage. This external storage may reside at various locations on various computing devices. Furthermore, as discussed below, the particular information that is exported to these locations and computing devices may be relegated to specific groups of data center equipment.

It should be appreciated that in at least one embodiment, the functionality of system 300 may be included in database module 212 of system 200.

In yet another embodiment, the work order module 214 may enable management of changes to the configuration of the data center, such as those resulting from a data center retrofit process as discussed below with regard to process 1100. In general, work order module 214 analyzes any changes made to the data center configuration by the other modules in system 200. Then work order module 214 generates a set of tasks that, once complete, will implement those changes. Next, work order module 214 translates the set of tasks to a set of work orders in human-readable form. Lastly, work order module 214 facilitates tracking of those work orders to completion. To accomplish these objectives, work order module 214 may expose various UIs and system interfaces to enable communication and interoperation with external entities.

In one embodiment, work order module 214 exposes a system interface through which integration module 210 may supply any changes made to the data center configuration. Work order module 214 may also expose a user interface including elements that enable a user, such as a data center manager, to modify and dispatch work orders to other users, such as technicians, for implementation. Work order module 214 may also expose a user interface to enable a user to configure a set of automatic dispatching rules. Further, work order module 214 may expose other user interfaces that enable users, such as technicians, to modify the details, including status, of work orders. These user interfaces may reside on various computing devices, including a mobile computing device.

Implementing such a user interface on a mobile computing device may allow users, such as technicians, to update the CMDB of the data center as configuration changes are made. This may produce several benefits including increased accuracy of the CMDB, due to the increased compliance with, and promptness of, configuration change updates. Another benefit may be increased productivity for users, such as technicians, because configuration changes may be entered while working on data center equipment, rather than entering changes at a workstation as a separate activity.

Work order module 214 may also implement modification and assignment system interfaces to interoperate with other systems. For example, work order module 214 may, through a system interface, utilize an external email system to notify users of a work order assignments. Lastly, work order module 214 may utilize a system interface that enables it to detect changes in data center resource demands and may use this information, when appropriate, to modify the status of a work order.

Figure 4:
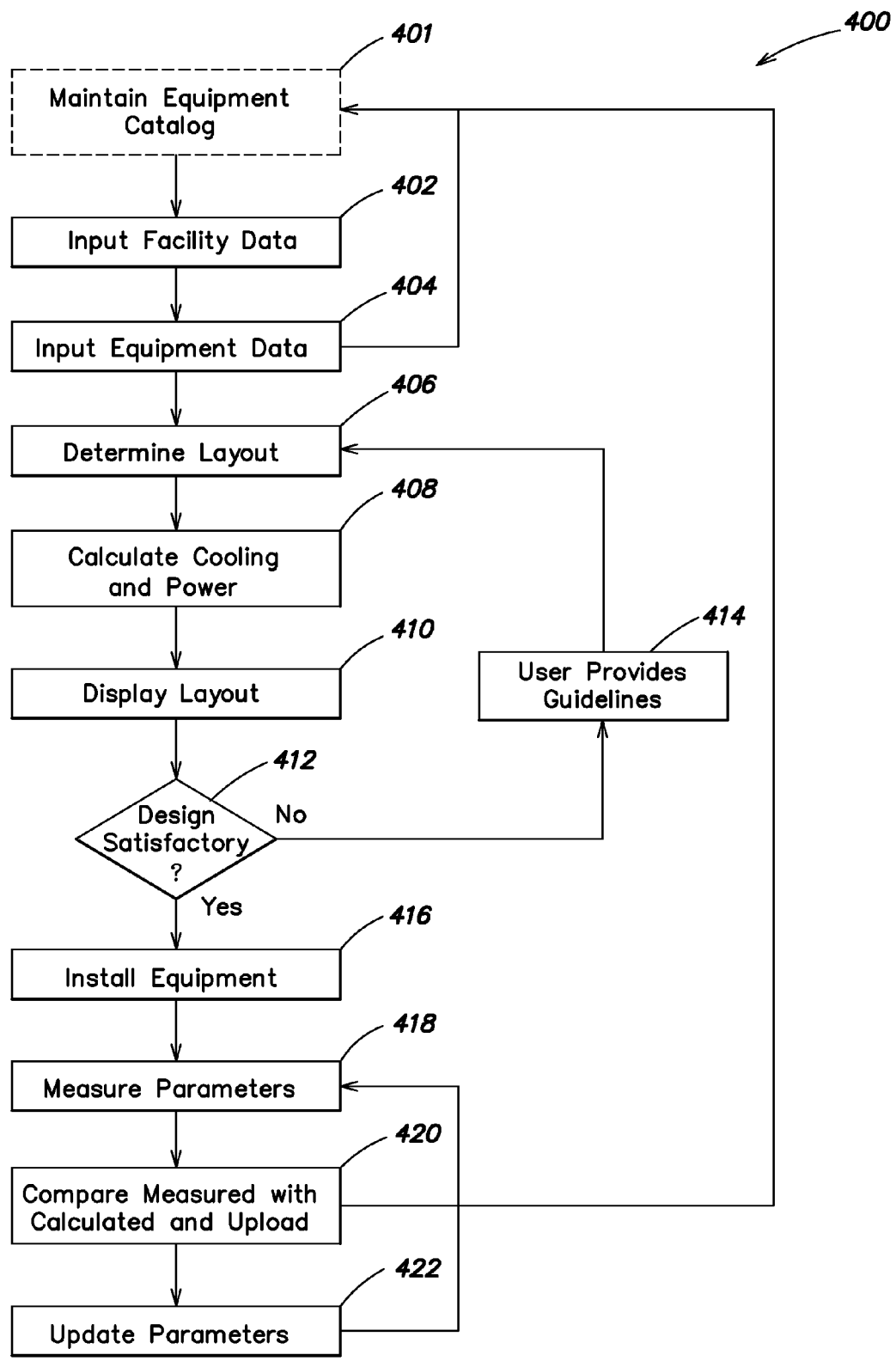
FIG. 4 is a flowchart of a process that may be implemented using the system of FIG. 3 in accordance with one embodiment of the invention.

A flow chart of a method 400 in accordance with one embodiment that may be performed using the system 200 will now be described with reference to FIG. 4. Initially, and optionally, at stage 401 of the method 400, a user may create groups of data center equipment. These groups may enable management of multiple types of data center equipment as a single collective entity. For example, inclusion of equipment in a group may designate such equipment as approved for use within all of the data centers owned by a customer or specific subsets thereof. Any data center equipment approved for use within a data center may be used during the design or retrofit of the data center.

Moreover, the user may arrange these groups in a hierarchical fashion. In one embodiment, a first group is created that includes all of the data center equipment supported by the system, a second group is created that is a subset of the first group and designates the equipment that is approved for use within the data centers of a particular customer, and a third group is created that is a subset of the second group and designates the equipment that is preferred for use within a particular customer data center. In one embodiment, a user may target specific groups for exportation to specific customers, customer data centers or specific computing devices within a customer data center, such as a mobile computing device.

Fashioning groups of equipment may ease maintenance and distribution of electronic data center equipment catalogs. For example, specific inclusion of data center equipment in a group that is lower in the hierarchy, e.g. a group designated for distribution to a mobile computing device within a specific data center, would require that equipment be present in ancestor groups. This inclusion may be performed automatically by the system. These groups may also be employed to enforce standardization of data center equipment within the customer organizational hierarchy by requiring that equipment be approved for use by the customer before it is allowed to be used to retrofit a specific customer data center.

In another embodiment, the system provider may create a group of standard data center equipment for distribution to customer data centers. This equipment catalog may be delivered with the initial system installation in a data center. The standard equipment may then be supplemented with customer specific, non-standard equipment used in a customer data center, as discussed with regard to stage 404 below.

Approved equipment may be further grouped into a preferred set for use with one or more customer data centers. The creation of these preferred data center equipment groups may be explicitly performed by the user or may be implicitly performed by the system based on usage of specific equipment by a customer or within a customer data center during data center design or retrofit.

In stage 402 of the method 400, information regarding the facility is loaded into the system. The information includes, for example, dimensions of the facility, number of rooms, locations of doors, support columns, other obstructions, parameters of data center resource capabilities, such as available power, cooling capabilities of the facility, whether a raised floor or drop ceiling is in use, and characteristics of any such floor and roof. Data center resource supply policies may also be entered in this stage. For data center resource providing equipment, such as electrical generators or CRACs, capability information may be loaded by receiving data center equipment information from interface 302 of system 300 of FIG. 3.

In stage 404 of the method, information regarding equipment to be installed in the facility is entered. The information includes, for example, the number of racks of equipment, maximum power draw for each of the racks, dimensions of the racks, and cooling requirements for the racks. The need for backup power sources and multiple power sources for equipment and or racks may also be entered at stage 404. In one embodiment, data center resource consumption and production characteristics of individual pieces of equipment that are to be loaded into racks may also be entered. Also, the weight of equipment (including equipment loaded into racks) may be used to ensure that the weight of the installed equipment is within any facility constraints. These characteristics may include, in addition to network connectivity, power and cooling requirements, the amount of rack space that the equipment needs to occupy and the type and/or number of electrical plugs that the equipment requires. In one embodiment, the database module 212 contains information regarding a number of devices, such as uninterruptible power supplies, equipment racks, cooling units, generator systems, power distribution units, automatic transfer switches, electrical routing devices, including cables, and servers and other computer equipment. In this embodiment, when a particular model number of a device is entered, characteristics of the device are retrieved from the database module. In one embodiment, interface 302 of system 300 provides these device/equipment characteristics to database module 212. Equipment related to fire protection and security may also be included in the design. Further, in at least one version, all equipment and components within equipment racks may include RFID tags, which can be used by systems of the invention to track location of equipment and racks. In another embodiment, any data center equipment characteristics that are added or changed by a user at this or the previous stage may be transmitted to interface 302 of system 300 for importation into database 304.

Once all of the information is entered into the system, at stage 406, the system in one embodiment determines a layout for the equipment in the facility, taking into account the data center resource requirements, such as power and cooling requirements, of the equipment as well as other characteristics of the equipment that were entered at stage 404 or retrieved from the database module. In another embodiment, the user may create the layout graphically, adding racks and other equipment where desired, and in this embodiment, the system will provide feedback during the layout process, disallowing some choices and making intelligent suggestions. These rules may include, for example: a standard alternating hot aisle/cold aisle layout must be specified, the plenum must be greater than some minimum value, the total room cooling capacity must exceed total room cooling load, aisles must be wide enough for access purposes and to meet building codes, distance between PDU and IT racks served by the PDU must not exceed some maximum value, PDU must be located immediately adjacent to a UPS, where a cable ladder spans an aisle, the aisle cannot exceed a maximum width, one or more data center resource capacities must be at a level sufficient to support target data center resource redundancy and/or runtime requirements, etc.

At stage 408, a phase-based power capacity analysis can be conducted to determine if the design provides adequate power for the equipment provided based on an analysis of the expected phase based power draw and the equipment installed in the racks. A cooling analysis may also be conducted at stage 408. In one embodiment, if the results of the cooling analysis indicate that one or more devices and/or racks are not receiving adequate cool air, or if the phase-based power capacity analysis indicates a lack of available power, then the procedure may return to stage 406 to change the layout of the equipment based on feedback provided from the analysis conducted at stage 408.

In an embodiment, a phase calculator uses measured peak power draw per phase as reported by rack mount power distribution units (RMPDU) via a management system combined with a computer model of the power and phase connections between power supplies, such as uninterruptible power supplies, power distribution units, RMPDUs, and the IT equipment. Each type of IT equipment in the model has a known expected peak power draw and a known location but the actual power connections between the IT equipment and the RP PDUs might be unknown.

For IT equipment where the details of the connections to the RM PDUs are unknown, the relative distribution of the measured peak power draw between the phases of the RMPDUs in the rack can be used to calculate the distribution of the expected peak power draw of the installed IT equipment. Based on the calculated distribution of expected peak power, the available capacity per phase per rack mount PDU can be calculated. In cases where no measured peak data is available and the connection between IT equipment and RM PDUs is unknown (for instance if the IT equipment has never been turned on) an estimated peak data value can be used to ensure that no phase will be overloaded.

A method for determining available power capacity of a phase of a power supply in a data center rack can include metering the power draw per phase of a power supply and calculating an average power draw per phase of a power supply. In one embodiment, this includes calculating available power capacity per phase of the power supply based on the average peak power draw and expected power draw data corresponding to data center equipment coupled to the power supply.

At the completion of the phase-based power capacity analysis, at stage 410, a room model is displayed showing the locations of the equipment in one or more rooms of the facility. The room model may include, for each equipment rack, or for individual data center equipment, information regarding the total data center resources, such as power and cooling, being consumed or produced as well as an indication of total available data center resources, such as power and cooling, to the rack or data center equipment. In one embodiment actual data center resource data, such as power and cooling data, may be displayed, while in other embodiments colors may be used, either alone or in combination with data, to display different levels of data center resource availability, such as power and cooling availability. For example, if a rack is operating with sufficient cooling air with a margin above a threshold, the rack may be indicated in green on the display, if the cooling air availability is closer to the threshold, the rack may be indicated in yellow, and if the rack does not have sufficient cooling air it may be indicated in red. Still further, the results of the analysis may indicate that adequate data center resources, such as power and/or cooling, are being provided for equipment, but that specified redundancy levels and/or runtime margins are not being met, either at the room level, a row level, a rack level, or at a specific piece/element of data center equipment.

In one embodiment, the system may display multiple room models and may allow the user to find one or a series of alternate satisfactory locations for the equipment based on the data center resource requirements of the equipment and any applicable redundancy and/or runtime requirements. Another embodiment may allow the user to find an optimum location, followed by other locations in a decreasing order of preference, for the equipment. Yet another embodiment may allow the user to specify both the data center equipment and location and may validate whether the location provides sufficient data center resources to satisfy the requirements of the equipment and any applicable data center supply policies. In still another embodiment, the system may suggest data center equipment to be placed at a user specified location. In this case, the system may ensure that applicable data center resource supply policies, and data center resource requirements of the suggested equipment, are met. Specific example details regarding the room model are described further below with reference to FIG. 5 and FIGS. 6A and 6B.

At decision block 412, a determination may be made by, for example, a facility designer as to whether the layout generated in stage 410 is satisfactory. The determination may be based on additional criteria of importance to the designer that was not included during the design of the original layout. For example, it may be desirable to have certain racks near each other or to have certain racks isolated from one another. At stage 414, additional criteria or other feedback can be provided and the process then returns to stages 406 and 408 where the room model can be refined. Stages 406 to 412 may be repeated until a satisfactory model is achieved at stage 412. In at least one embodiment, at the completion of the design stage, a bill of materials is generated and may be used to provide the cost of the equipment to be installed in the facility and may also be used to generate a sales order for the equipment, providing a simple solution for ordering all equipment associated with a new data center. Further, CAD drawings and electronic files that capture the designed layout may also be generated. In another embodiment, this data center configuration is transmitted to interface 302 of system 300 for storage in database 304 in the form of a CMDB for the installed data center.

At stage 416, the equipment is installed in the facility according to the layout generated at stages 406 to 414. In one embodiment, measurement equipment to measure cooling characteristics and power characteristics may be installed with the equipment. The measurement equipment is described further below, and may include, for example, devices for measuring power, airflow, humidity and temperature at various locations in the facility and within equipment racks located in the facility.

At stage 418 of the process 400, power and cooling parameters are measured using the measurement equipment. Additional temperature measurements may also be provided by devices, such as servers, that have the capability to detect internal temperatures. The parameters measured may be used continuously by the management module of the system 200 to detect error conditions and to monitor trends that may lead to an error condition. Further, in the process 400, the measured parameters can be compared with predicted parameters calculated during the design process in stages 406 and 408. For example, in one embodiment, the airflow through a perforated floor tile of a raised floor is used to determine the available cooling air of a rack located adjacent the floor tile. The airflow through the perforated tile may be determined in stage 408 using one of a number of computational methods that are described further below, or the airflow may be determined using data from related physical measurements or simulations. Once the equipment is installed in the facility, the perforated floor tile may be instrumented to measure the actual airflow through the tile. The actual measured value may then be compared with the calculated value at stage 420. If the two differ by more than a predetermined threshold, then an indication or warning may be provided and the calculations conducted in stage 408 may be conducted once again at stage 422 using measured values in place of calculated values as appropriate to obtain updated parameters. In another embodiment, measured parameters are transmitted to interface 302 of system 300 for storage in database 304. As discussed above, the storage of these measure parameters by interface 302 may trigger further analysis and summarization of the measure parameters into data center equipment consumption and production benchmarks.

After stage 422, the model of the facility described above with reference to stage 410 may be displayed with values of power and cooling availability and consumption updated to reflect any differences between measured parameters and calculated parameters. Any out of tolerance conditions (for either cooling or power) may be indicated on the display using, for example, a color coded scheme as described above. In one embodiment, a user may be provided with a number of available options to correct an out of tolerance condition. The options may include upgrading or adding facility equipment (i.e., an air conditioning unit or an uninterruptible power supply) or may include moving equipment and/or racks. Stages 418 to 422 of the process may be performed continuously as part of a management system of the data facility.

In one embodiment of the invention, stages 402 to 414 of the process 400 are implemented using a build-out system accessible by a user over the Internet. In this embodiment, the user provides the requested information, and the build-out system provides the processing described above, provides outputs to the user over the Internet, and stores results locally. After the equipment has been installed in the facility, the management system 1000 (described below in connection with FIG. 10) may access the build-out system to download information related to the equipment. In addition, when a retrofit of the facility is to occur, the management system may contact the build-out system to coordinate the design of the retrofit. In at least one embodiment, electronic files may be imported/exported between the systems to provide a complete transfer of all information related to a data center's design.

Figure 5:
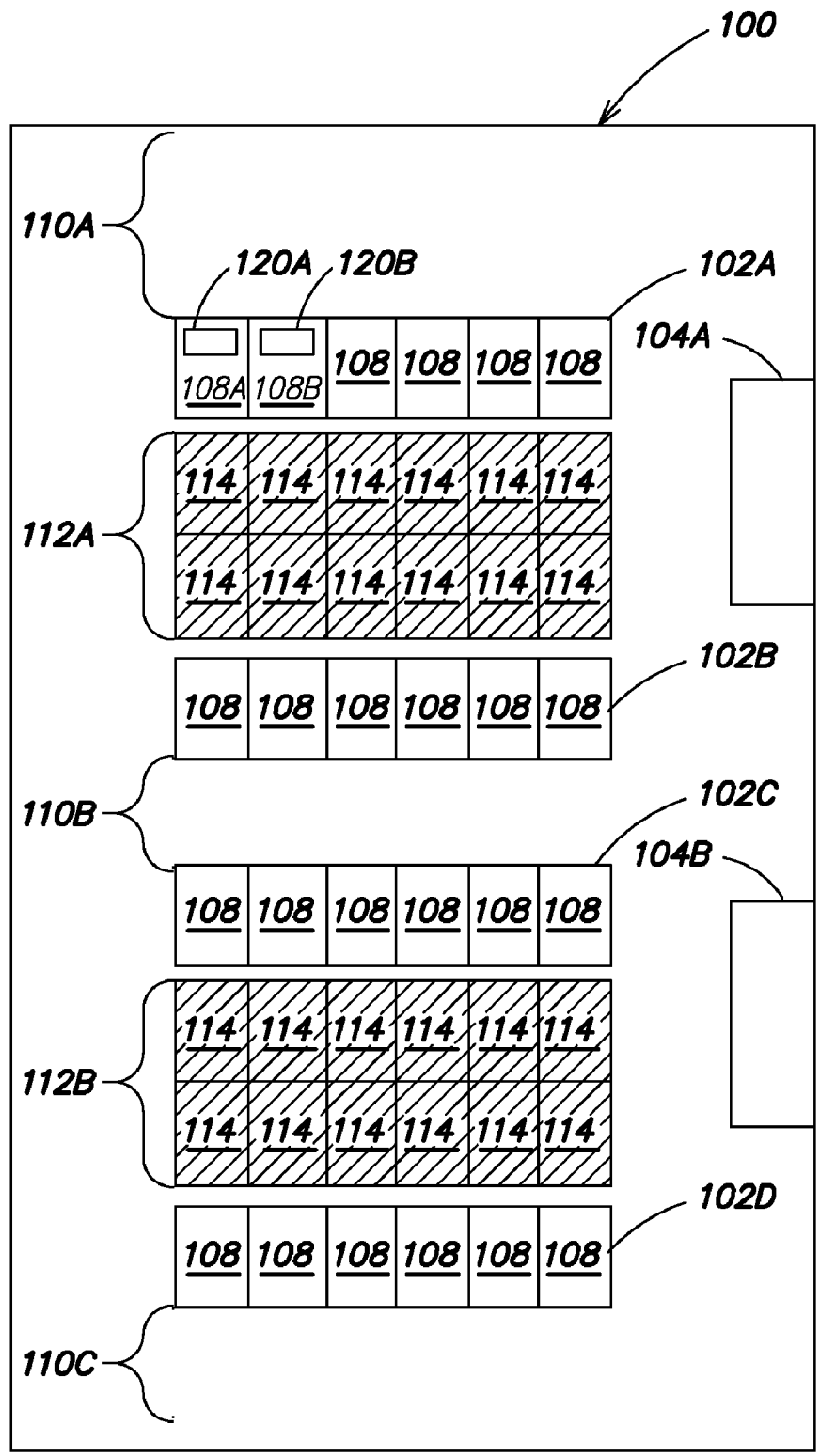
FIG. 5 is a diagram showing facility information that may be displayed using at least one embodiment of the invention.

FIG. 5 shows an example of a display of a room model that may be generated using the system 200 and the process 300 and shown on a computer display. It should be appreciated that this computer display may be any be coupled to, or included in, any sort of computing device including a mobile computing device. The room model shown in FIG. 5 is essentially the data center 100 previously discussed above with reference to FIGS. 1 and 2. However, in FIG. 5, additional data related to the power and cooling consumption and capacity of each rack, U space positions, and/or elements of data center equipment housed within each rack may be included in an informational block, such as informational blocks 120A and 120B shown on two of the racks 108A and 108B in FIG. 5. Informational blocks may be included on data center equipment, each rack, or on less than all racks, for example, by row, zone, or cluster.

FIGS. 6A and 6B show enlarged views of respectively racks 108A and 108B that may also be shown on a computer display of systems of embodiments of the invention. In the views of FIGS. 6A and 6B, specific information regarding the racks and U space positions is included in the informational block. In the embodiment shown, the information in the block includes a rack identifier 122, a rack type 124, power capacity 126, power usage 128, cooling capacity 130, cooling usage 132, contents of the rack 134, power redundancy 136, cooling redundancy 138, and UPS runtime 140. In other embodiments, information for each rack may be included in tabular form, or in the form of columnar bars, on a graphical display showing the room layout. Data center information that may be displayed includes data center resource redundancy and runtime measurements and capacity measurements, such as available capacity, utilized capacity, and stranded capacity. As discussed further below, stranded capacity includes excess capacity that is nominally available, but unusable, due to insufficient associated capacity of another data center resource required by data center equipment.

The rack identifier 122 includes a row number and a rack number, however, in other embodiments, the rack identifier may also include an indicator of the type of rack, membership of the rack to a particular row, zone, group, or cluster, manufacturer of the rack, as well as other information. The rack type 124 identifies the particular type of rack, i.e., server rack, router rack or telecommunications rack. The power capacity 126 indicates the maximum power capacity of the rack, and the power usage indicator 128 indicates the percentage of maximum capacity at which the rack is expected to operate. In different embodiments, the power usage indicator may be calculated based on manufacturer supplied data for equipment contained in the rack and/or based on actual power measurements of equipment. The power capacity for a rack, in at least one embodiment, is determined based on limitations of devices and/or power cables that supply power to the rack, such as circuit breakers, UPSs or any other devices. The contents of the rack 134 includes a list of the equipment contained in the rack and may include an indication of remaining space in the rack displayed, for example, in terms of rack units, which are typically referred to as "U" with 1U equal to 1.75 inches. Details regarding the equipment in the rack, including operational status and network addresses, such as an IP address for a device may also be included.

The cooling capacity indicator 130 and cooling usage indicator 132 identify respectively the quantity of cooling air available to the rack and the percentage of that cooling air that is being used by equipment in the rack. In other embodiments power and cooling usage may be indicated using various types of graphical gauges, such as a bar graph, that indicates power and cooling usage and capacity. In the embodiment shown in FIGS. 6A and 6B, the cooling capacity is shown in terms of kilowatts (kW). In other embodiments, depending on the type of equipment that is installed in the racks, the power required by a rack may not be equal to that consumed by the rack and may be calculated based on manufacturer's data for the equipment, based on test results, or in any other manner.

In embodiments of the present invention, during the design as well as during the management of a data center, the true available capacity of a data center can be determined at U space position level, the rack level, at the row level and at the room level. In determining available capacity (including unused capacity), data center resources including both cooling and power capacity are used, and the true available capacity can be determined using the lowest data center resource capacity. In situations where data center resource capacities are not equal, the excess capacity can be considered wasted or stranded capacity that can not be used in the present design. In other words, while stranded capacity is nominally available, it is unusable due to insufficient associated capacity. In embodiments of the present invention, the stranded capacity can be determined at the U space position level or rack level and can be totaled to determine stranded capacity at the row level and at the room level.

In management systems and methods of embodiments of the invention, as described above, data center resource capacity and availability, such as power and cooling capacity and availability, may be monitored in real time. In one version, changes to the availability rate (or the utilization rate) are monitored and based on these changes, the growth rate of a data center may be determined, and predictions of dates when additional capacity will be required can be provided. In one embodiment the forecasting method used to make these determinations is linear regression. Other forecasting methods are possible without departing from the spirit of the present invention. The ability to monitor capacity and predict future capacity needs allows data center operators to control costs and plan for upcoming expenses. Further, determinations may be made as to the additional expenses that will be incurred if new equipment is added. The total cost (for example per kilowatt) can also be determined during the design phase or during operation.

In embodiments of the invention described herein, data center layouts may be designed to provide specific redundancy levels (i.e., n, n+1 or 2n) for data center resource design, such as both the power design and the cooling design. In data centers in the past, additional room cooling units are typically provided to include some redundancy in a data center, such that an overall cooling capacity of the data center can be maintained, even when one or more of the room cooling units fails or must be powered down to conduct maintenance. One problem with these past solutions is that the cooling redundancy is designed at the room level and not the rack level, and while overall cooling capacity may meet redundancy requirements, cooling at the rack level may not meet the desired redundancy requirements. In embodiments described herein, the ability to provide accurate airflow data at the rack level and U space position level allows true cooling redundancy to be designed into a solution.

Figure 7A:
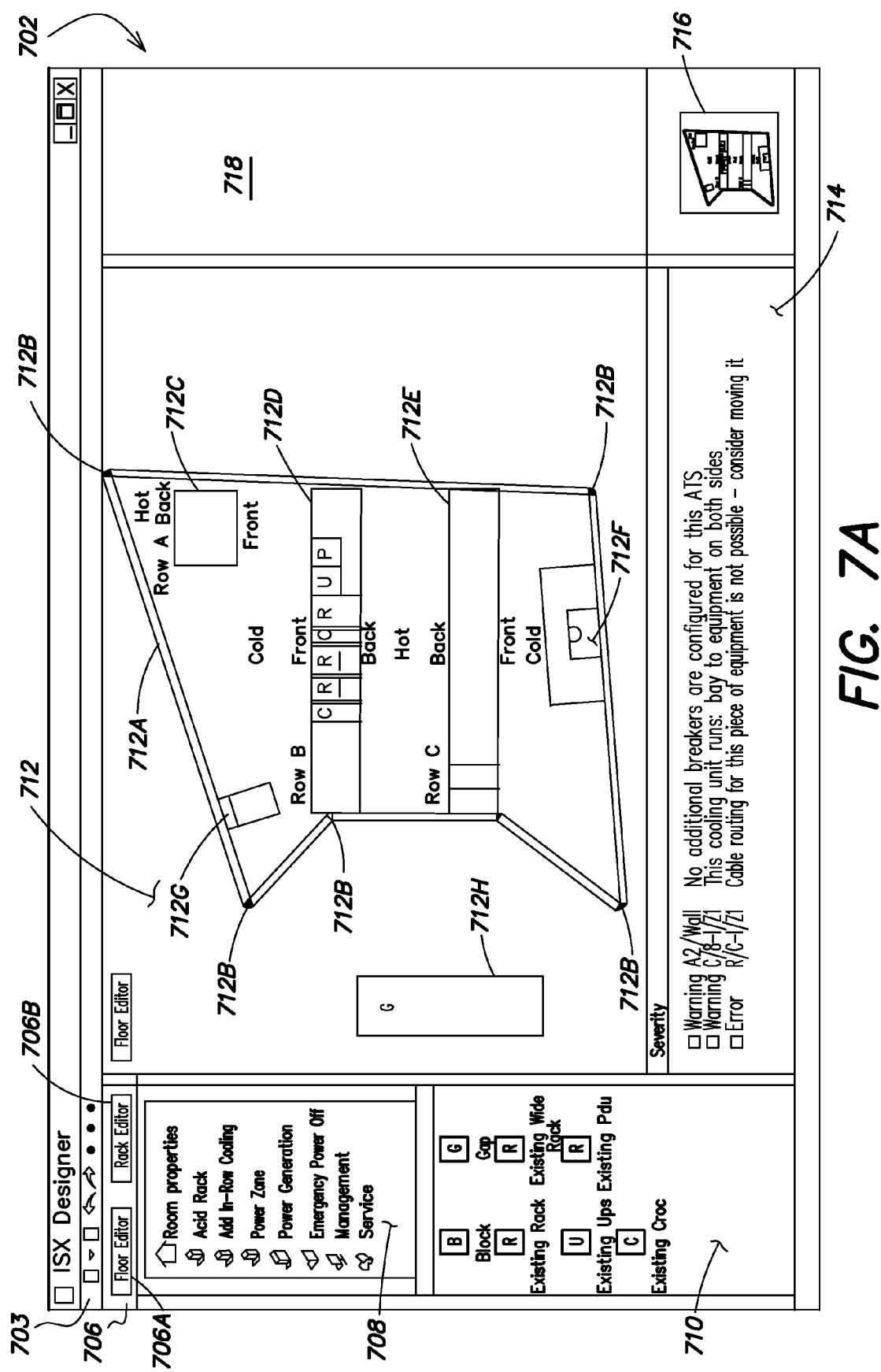
FIGS. 7A and 7B show graphical user interface screens that exhibit various aspects of the present invention that may be used with information displayed in FIGS. 6A and 6B.
Figure 7B:
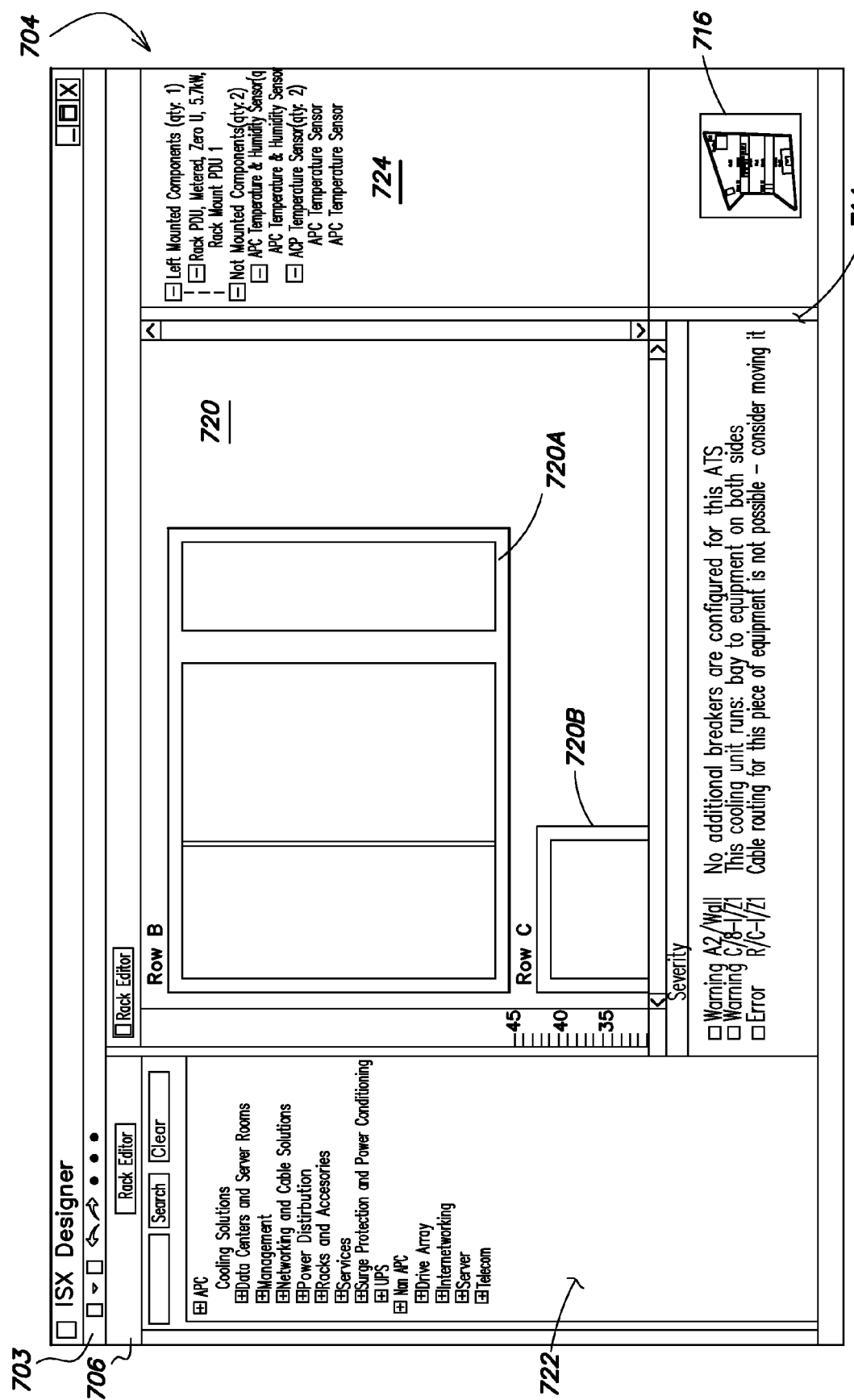

As discussed above, graphical user interfaces may be used with embodiments of the present invention to assist in the design and management of data centers. Particular user interface screens used in one embodiment to design a layout in a data center will now be described further with reference to FIGS. 7A and 7B. FIG. 7A shows a floor editor interface 702 used in one embodiment to layout equipment in a data center, while FIG. 7B shows a rack editor interface 704 used in one embodiment to provide further details of the contents of equipment in the data center. In one embodiment of a data center design system, tutorials are provided for a user to assist the user by providing best practice design guidelines. The tutorials may be accessed by a user as desired or may be configured to be displayed as a user is taking a particular action.

The floor editor interface includes a main menu 703, a tool bar 706, a configuration box 708, a generic components box 710, a floor layout box 712, a status box 714 a full-image viewing box 716, and an unplaced equipment box 718. The main menu 703 provides a drop-down menu in a format known to those skilled in the art, and allows a user to perform various functions, including the ability to "undo" and/or "redo" changes that are made to the layout. The tool bar 706 provides short hand access to functions of the design system, and in one embodiment includes a floor editor button 706A and a rack editor button 706B. In one embodiment, activation of the floor editor button results in the display of the screen shown in FIG. 7A, while activation of the rack editor button results in display of the screen shown in FIG. 7B.

The floor editor box 712 shows the layout of equipment in a data center being designed and provides text that identifies the equipment contained in the layout. A room perimeter 712A shows the exterior walls of the room along with dimensions of the room that can be set by a user. In one embodiment, when a new design is started, the user is presented with a screen showing a number of basic room configurations that can be selected. Further, the walls of the room can be moved by a user by selecting one of buttons 712B, and additional buttons can be added where needed to expand or shrink an area of the room. In one embodiment, the room size may be changed as equipment is added to the layout. Three rows 712C, 712D and 712E are outlined in the room shown in FIG. 7A In other embodiments, more or less rows may be included. As shown in FIG. 7A the rows are configured in a manner to provide alternating hot and cold aisles. Row 712D includes three equipment racks (identified by "R"), two half-rack cooling units (identified by "C") a UPS ("U") and a power distribution unit ("P"). Row 712E includes one rack, and row 712C as presently configured does not include any equipment. During the design phase additional equipment may be added to each of the rows. The room also includes an automatic transfer switch (ATS) 712G and a cooling distribution unit (CDU) 712F. Hatched areas are shown on the display around the ATS and CDU to indicate that these areas should be kept clear of equipment. Each piece of equipment in the room may include identifiers that indicate the type of rack as well as the rack's location in the room and the power source for the rack. Further, as discussed above, each rack may include information regarding data center resource use and availability, such as power and cooling use and availability. Still further, text may be provided on each row to indicate total data center resource information, such as power and cooling information for each row.

The configuration box 708 includes eight configuration options for designing a data center. A room properties configuration option, when selected, allows a user to identify data center resource values, such as physical, power, and cooling values, that affect the data center design as a whole including dimensions of the room, aisle widths and total anticipated power density for the data center. Data center resource redundancy and/or runtime requirements, such as power redundancy requirements (i.e. N, N+1, 2N), cooling redundancy requirements and runtime requirements for UPS systems may also be set. The number of data troughs that will be used and location of power distribution and cooling line distribution (i.e. overhead or under a raised floor) can also be configured. In one embodiment, only in-row cooling is provided, however, in other embodiments other types of cooling solutions may be used as well. In at least one embodiment, individual rows may be rotated to different angles in the data center. Further, while only one room is shown in FIG. 7A, at least one embodiment allows a data center to include multiple rooms. These rooms may be active rooms, which hold active data center equipment, and inactive rooms for storage of spare or decommissioned equipment.

An add rack configuration option in the configurations box 708 is used to add equipment racks to the data center design. When this option is selected, a user is presented with choices of various types of racks to add to the data center. When racks are selected, an indicator is provided in the unplaced equipment box 718, indicating that the racks still need to be placed into the room layout.

An add in-row cooling option in the configuration box is used to add in-row cooling units to the data center design. When this option is selected, a user is presented with various types of cooling units that can be added in the rows. As with equipment racks, when a cooling unit is selected, an indicator is provided in the unplaced equipment box 718, indicating that the cooling unit still needs to be placed in the room layout.

A power zone option in the configuration box is used to identify and select PDUs and UPSs and to indicate which equipment will be powered from the UPSs and PDUs. Characteristics of the PDUs and UPSs may also be selected. Once selected, an indicator is provided in the unplaced equipment box 718 for the UPSs and PDUs. In one embodiment, multiple racks may be included in a selection on the layout to identify the equipment that belongs to a particular power group, also known as power zone. In still another embodiment, after selection of equipment and UPSs and PDUs, an automatic power zone option may be implemented in which the system matches equipment power requirements (i.e., redundancy levels, runtime durations, voltages, phasing) to those of the UPSs and PDUs and assigns power zones automatically and determines lengths of power cables that are needed to power equipment from the assigned PDU. In automatically determining power zones, the system may also identify the need for additional UPSs and PDUs.

A power generation option in the configuration box 708 is used to identify and select an automatic transfer switch (ATS) and generator. Again, once these are selected, an indicator is provided in the unplaced equipment box 718.

An emergency power off option in the configuration box is used to select an emergency power off (EPO) solution for the data center design, and once selected, an indicator for the EPO solution will be added in the unplaced equipment box.

A management option in the configuration box 708 allows a data center manager, such as the InfrastruXure® Manager and/or InfrastruXure® Central discussed above, to be added. In one embodiment, when selecting the manager, a rack location for the manager is also selected.

A service option in the configuration box 708 allows a user to select a level of service to be provided to the data center by a data center services organization.

Other configuration options may include a row planning configurator that allows a user to plan how many racks a row can support by defining the power and cooling settings for the row, prior to placing equipment in a row. In one embodiment, the row planning configurator may provide an estimate on the number of racks that can be supported based on the power components and in-row cooling units contained in the row. In one embodiment, the row planning configurator may provide a complete layout based on design best practices.

The generic components box 710 includes a number of icons to designate pre-existing equipment in a data center. The components may be selected and "dragged" into position in the layout. In one embodiment, the generic components include blocks and gaps. The gaps can be used to identify areas over which cables and conduits can be routed (i.e. a walkway), while the blocks are used to identify areas over which cables and conduits can not be routed (i.e. a column). Once dragged onto the layout, the blocks and gaps can be sized appropriately.

As discussed above, when equipment is selected for use in the data center, an icon appears in the unplaced equipment box 718. To place the equipment in the layout, the icon is selected and dragged into the appropriate location in the layout. Existing equipment may be repositioned using this same method. For example, existing equipment may be dragged from an active room and dropped in an inactive storage room, thus enabling the system to track unutilized equipment available for provisioning elsewhere. In one embodiment, when adding an in-row cooling unit, the icon for the cooling unit can be placed between two adjacent racks and released, and the racks will then move in the row to allow the cooling unit to be inserted between the racks. Further, in one embodiment, a snap-to feature is employed to align equipment properly in rows and along walls, and in addition, rows and equipment may be aligned along and "snapped to" floor tiles when, for example, a raised floor is in use. Using this feature, a user does not need to precisely align objects.

The full-image viewing box 716 provides a "bird's eye" view of the layout contained in the floor layout box 712. In one embodiment, the zoom button on the tool bar can be used to enlarge the view of the data center layout in the floor layout box 712. When the view is enlarged, the entire layout may not appear in the floor layout box. The full-image box 716 still displays the full image of the layout for the user. In one embodiment, when the full layout does not appear in the floor layout box, an overlay is used in the full-image box to indicate on the full-image, the portion of the layout that is displayed in the floor layout box. In one embodiment, when the full image is not displayed in the floor layout box 712, the overlay may be selected and dragged within the full-image viewing box to select which part of the layout is displayed in the floor layout box.

The status box 714 is used to display warnings, errors and other conditions to the user. The warnings may vary in severity and may include indications that design guidelines are being violated and may also include more severe warnings indicating that data center resource capacities, such as power and cooling capacities, have been exceeded, or that redundancy and/or runtime requirements are no longer met. In one embodiment, when the status box indicates that there is an error or warning associated with a particular piece of equipment in the layout, the piece of equipment may be highlighted with a color such as red or yellow. In at least one embodiment, when an error or warning occurs, guidelines for correcting the error or warning are provided by either selecting a highlighted piece of equipment or the error or warning message directly.

The rack editor interface 704 will now be described further with reference to FIG. 7B. The rack editor interface includes the tool bar 706, the status box 714 and the full-image viewing box 716 discussed above. Further, the rack editor interface 704 also includes a rack editor box, a product catalog box 722 and a rack content section 724.

The rack editor box 720 shows the front face of each of the equipment racks in the data center layout with the racks being arranged by row. In FIG. 7B, two rows of racks 720A and 720B are shown. As shown in FIG. 7B, in one embodiment, only the equipment racks are shown in the rack editor box. When a particular rack is selected in the rack editor box, then the contents of the rack appear in the rack content box 724, and components may be added to the selected rack. Racks may be selected in the rack editor box or may also be selected in the full-image view box 716. When a rack is selected in the full-image view box, then the image in the rack editor box will shift, if necessary, to provide a view that includes the selected rack.

The product catalog box 722 provides a comprehensive listing of components that may be used in equipment racks in data centers. The user may select equipment to be included in each rack, and as equipment is selected, it is included in the rack content box 724. The list may include only equipment of a particular manufacturer or may include equipment from several manufacturers. In one embodiment, all necessary hardware and cabling associated with rack equipment may be selected from the product catalog box.

Figure 14:
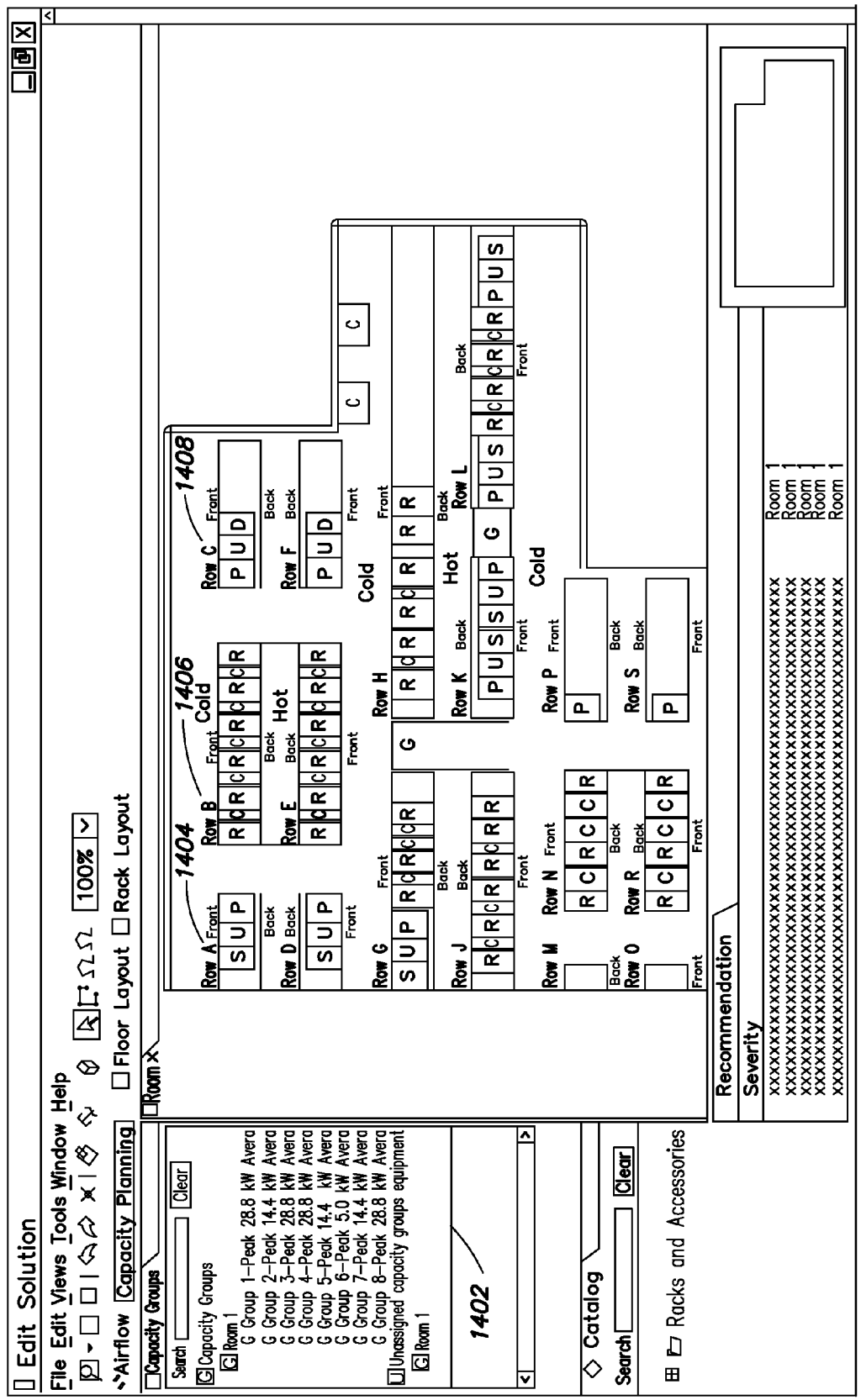
FIG. 14 shows graphical user interface screen that exhibits various aspects of the present invention.

In one embodiment depicted in FIG. 14, a user may review and manage data center resource capacity and available supplied to data center equipment. Many of the features of this embodiment are similar to those described in reference to FIG. 7A above. In addition, FIG. 14 includes capacity group explorer 1402, which presents a logical grouping of data center equipment, such as racks, based on common capacity requirements. This grouping enables a user, such as a data center designer, to manage sets of data center equipment as one collective entity for capacity planning purposes. Representations of individual elements of data center equipment, such as UPS 1404, Rack 1406, and PDU 1408 may present the user with columnar bars depicting various data center resource redundancy and/or runtime measurements and capacity measurements, such as available capacity, utilized capacity, stranded capacity. For example, Rack 1406 has an as-configured potential power and cooling demand of 28.8 kW and a current actual power and cooling demand of 7.92 kW. In other embodiments, these demand or consumption measurements may be matched against as-configured potential power and cooling supply capacity and actual power and cooling capacity to ensure all capacity, consumption, redundancy and runtime requirements are met. In other embodiments, the interface may be displayed on a mobile computing device, or as a three dimensional rendering of the data center.

As discussed above, with reference to the process shown in FIG. 3, the system 200, and other systems of the present invention, may be used as part of a data center management system. The management system may include the system 200 described above with the management module containing routines to perform management functions, or in other embodiments, the management functions may be performed by a designated manager controller contained in the data center and implemented, for example, in a computer server located in one of the racks of equipment and accessible by a user using a management console.

Figure 10:
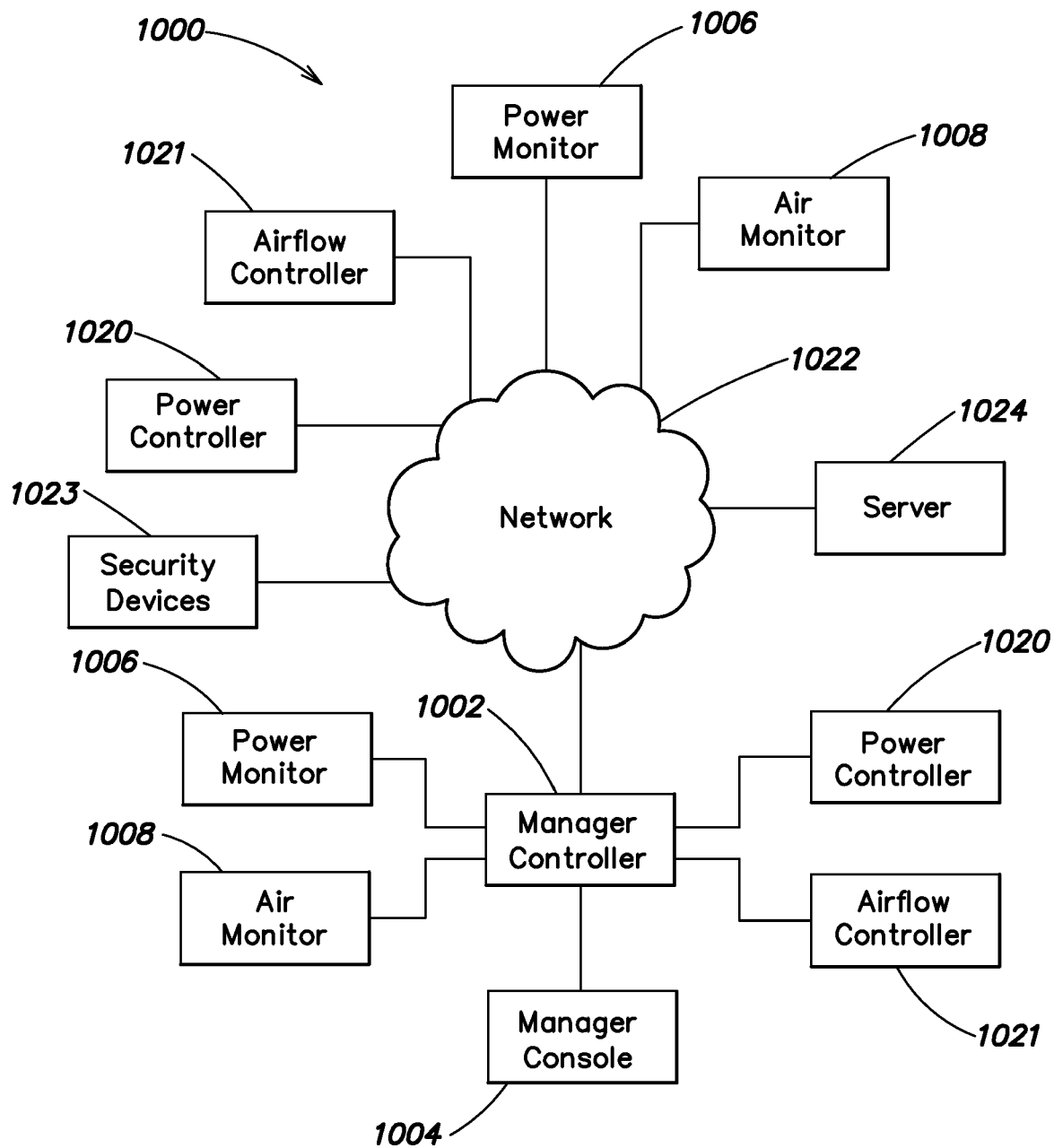
FIG. 10 is a functional block diagram of a management system in accordance with one embodiment of the invention.

FIG. 10 shows a block diagram of a management system 1000 that may be used in embodiments of the present invention. The management system includes the manager controller 1002, the manager console 1004, power measurement devices 1006, and airflow, humidity and temperature measurement devices 1008. It should be appreciated that manager console 1004 may be implemented as any computing device, including a mobile computing device. Implementing manager console 1004 on a mobile computing device may allow a user, such as a data center manager, to, for example, dispatch work orders to technicians while physically inspecting, installing, moving, and/or changing data center equipment. In addition, in one embodiment, the management system may include power control devices 1020 to control application of power to one or more individual devices or racks contained within a data center, and the system may include airflow controllers 1021 to control the airflow or supply temperature of an air conditioning unit or to control, for example, perforated tile dampers. As discussed above, the management system may also include one or more security devices 1023, including security cameras. The devices of the management system 1000 may be directly coupled to the manager controller or may be coupled to the manager controller using a network 1022 that may be a dedicated network, may include the Internet, or may include a LAN or WAN contained in the data center. The manager controller may communicate with one or more servers 1024 to obtain information from and control operation of the servers.

In one embodiment, the management controller 1002 may be implemented at least in part using an InfrastruXure® Manager and/or InfrastruXure® Central available from American Power Conversion Corporation (APC) of West Kingston, R.I., and devices may be coupled to the manager using, for example a controller area network (CAN) bus or an Ethernet network. The power controllers and airflow controllers may be implemented using available known devices that monitor and/or control power and airflow in facilities. Further, in at least one embodiment, the management system 1000 may include systems and methods for monitoring and controlling power as described in U.S. Pat. No. 6,721,672 to Spitaels et al, which is incorporated by reference herein. Further, in at least one embodiment that uses in-row cooling devices, the management controller may communicate with the cooling units to control the units to ensure that adequate cooling at specified redundancy levels is being met. Further details regarding the control of in-row cooling units that can be used with embodiments of the invention are discussed in copending U.S. patent application Ser. No. 11/335,901, discussed above and filed on Jan. 19, 2006.

Figure 11:
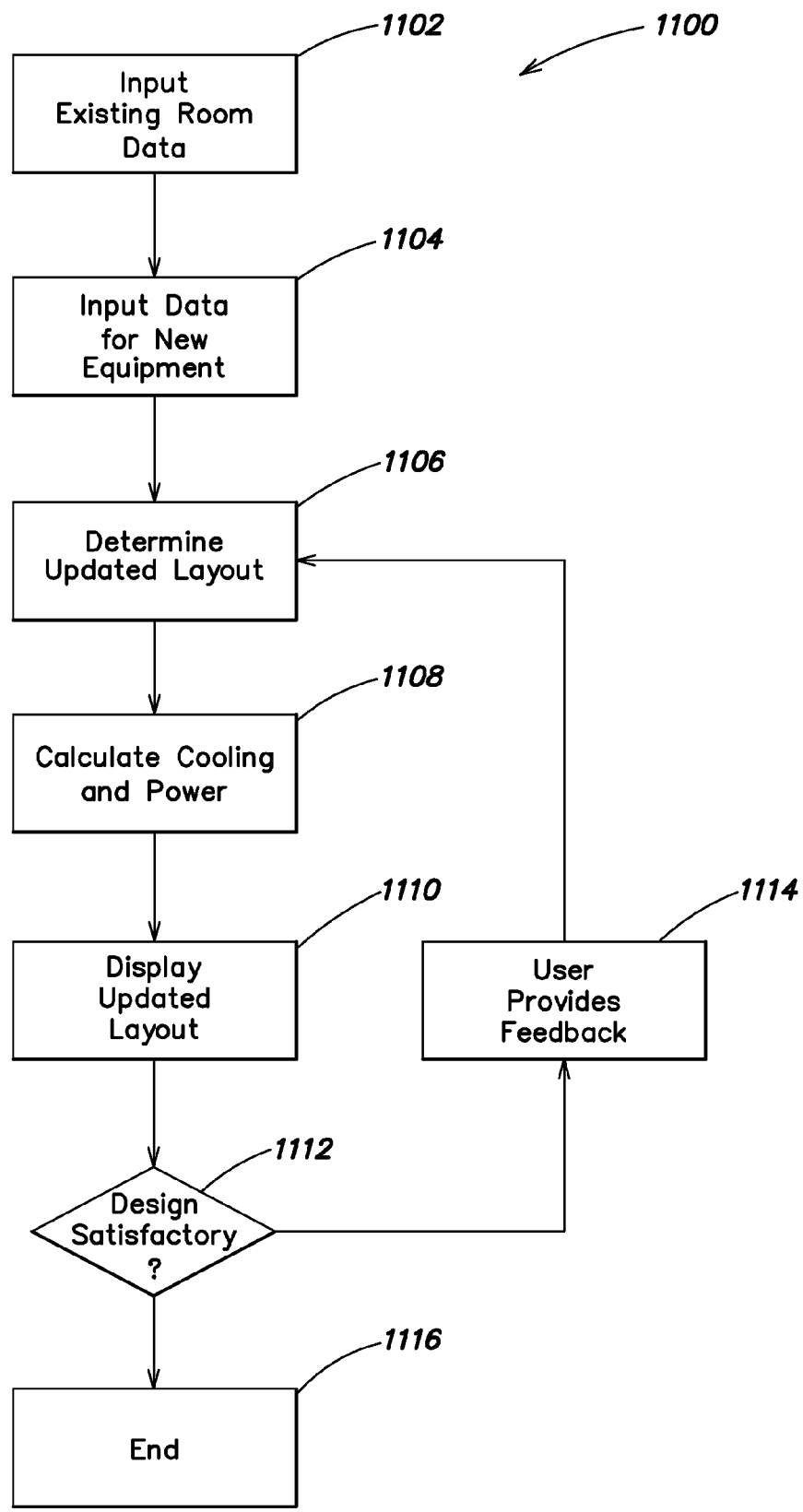
FIG. 11 is a flow chart of a management process in accordance with one embodiment of the invention.

One aspect of the present invention, which will now be described, is directed to a retrofit system and method that is particularly useful for adding new equipment to a facility. The addition of new equipment may include adding equipment to existing racks or may include adding other data center equipment, such as racks or other floor mounted equipment, to a facility. The retrofit system may be a standalone computer system configured to perform processes described herein, or in one embodiment, the retrofit system is implemented using the system 200 described above. Specifically, the builder module 206 of the system 200 may include routines to assist in retrofitting a data center. A process 1100 for using the system 200 (or some other system) to retrofit or upgrade a data center will now be described with reference to FIG. 11, which shows a flow chart of the process 1100.

In a first stage 1102 of the process 1100, data related to a present configuration of a data center to be retrofitted is provided to the builder module. The data related to the present configuration may include the data displayed in the room model of FIG. 5 along with additional data that was generated during design of the data center. Further, in one embodiment, the data related to the present configuration may include data generated during an initial design as updated by actual measurements conducted in a facility. For example, the cooling capacity of individual racks may be calculated in an initial design and then updated by the management module once the system is installed and operating. Cooling capacity data may be updated based on actual measurements of airflow from, for example, perforated floor tiles, while the original data may have been calculated based on predicted airflows. In one embodiment, interface 302 of system 300 provides this data center configuration and measured parameter information from database 304.

Information related to the retrofit is then provided in stage 1104. The information related to the retrofit may include information similar to that input at stage 404 of process 400 described above, such as type of equipment, characteristics of equipment, number of racks, as well as other information. In addition, a user may designate one or more desired locations in the data center for the installation of new equipment. For example, a user may desire to add five additional servers to the data center, where the servers are similar to and have a related function to existing servers in the data center. The user may choose one or more preferred locations based on power specifications, cooling specifications and physical dimensions of the servers, and based on power capacity, power plug type and/or number, cooling capacity and contents of existing racks displayed on a floor model of the data center. In addition, the user may indicate whether it is acceptable to move existing equipment to accommodate the installation of new equipment. In another example, a user may desire to replace three servers in the data center. The user may choose the servers targeted for replacement and may make other data center modifications with these replacement servers in mind. In addition, the user may indicate whether the replaced equipment should be removed from the data center or moved into an inactive storage room. Tracking inactive equipment may allow a user, such as a data center manager, to quickly ascertain equipment available for provisioning within the data center.

At stage 1106, an updated layout for the data center is generated and cooling and power calculations are performed at stage 1108 on the updated layout in the manner discussed above at stage 408 of process 400. If the user has designated specific locations for equipment in the data center, the layout may first be determined using these locations, and if problems arise as a result of the desired layout (i.e., lack of cooling for a rack based on equipment or supply policy requirements), then the user will be able to note any such problems once the layout is displayed and can then choose to change the layout. In one embodiment, the system may suggest one or more elements of data center equipment to be placed at one or more locations. In this case, the system may ensure that applicable data center resource supply policies, and data center resource requirements of the suggested equipment, are met. In another embodiment, the system may provide the user with one or a series of satisfactory locations for the equipment based on the data center resource requirements of the equipment and any applicable data center resource redundancy and/or runtime requirements. In another embodiment, the system may provide the user with an optimum location, followed by other satisfactory locations in a decreasing order of preference, for the new equipment based on the data center resource requirements of the equipment and any applicable data center resource redundancy and/or runtime requirements. If a particular layout is not designated by a user, then the system 200 will determine the layout in the manner discussed above with respect to stage 406 of process 400.

At stage 1110, an updated floor model is displayed (for example, in the manner shown in FIG. 5), and at stage 1112, a user can review the model and either provide feedback (stage 1114) or indicate that the design is satisfactory. Once the floor model has been approved by a user, the retrofit design process is complete, and the equipment may be installed, relocated, or removed and parameters of the data center may be measured and updated in the manner described above in stages 418 to 422 of process 400 using for example a data center management system.

In embodiments of the present invention, using the processes described above, data center operators are able to determine, in essentially real-time, whether additional equipment may be added to a data center and may also determine locations for the equipment, where data center resource requirements, such as both power and cooling requirements, of the equipment may be met. Further, reports may be generated that indicate to a user or data center manager how much capacity, redundancy and/or runtime is available for each row, for each rack, for each U space position, for each piece of data center equipment and for the facility in its entirety. Still further, as discussed above, in determining overall capacity, systems and methods are able to identify and display stranded capacity, and provide suggestions for reducing the stranded capacity.

FIG. 8 is a diagram showing additional information that may be displayed using other embodiments of the invention. For example, and as illustrated in FIG. 8, capacity options such as redundancy levels (e.g., 2N) groups or rack clusters in a data center, line configurations, group power options, or indications of peak or average power draw amounts may be provided as part of a graphical user interface.

Figure 9A:
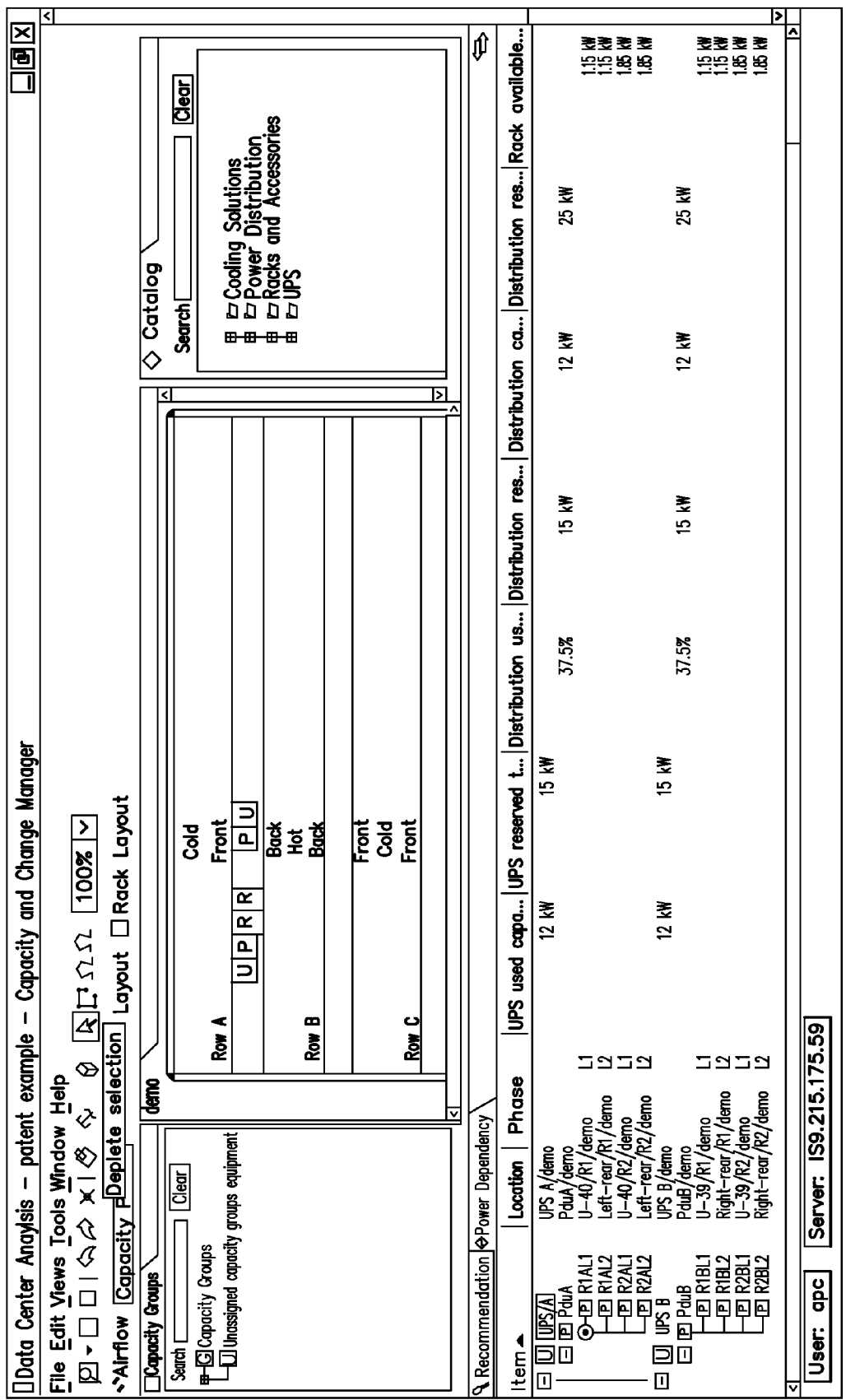

FIGS. 9A and 9B illustrate graphical user interface screens that exhibit various aspects of the invention. In one embodiment, a data center can have a plurality of racks and a plurality of sources of power. As illustrated in FIG. 9A, a data center can include two racks and two sources of power. The graphical user interface can be used to manage facility power distribution and resource allocation relationships between uninterruptible power supplies (UPS), main power distribution units and rack mounted power distribution units (RMPDUs) in multiple equipment racks (IT racks). An embodiment can be implemented using RMPDU products available from American Power Conversion Corporation (APC) of West Kingston, R.I., such as those having APC part numbers AP7564, AP7568, AP7851, or AP7853, for example.

A rack may include at least one RMPDU, which can distribute power to various rack components or plug-in devices. For example, each of a plurality of racks in a data center may include at least one electronic device or load such as a computer, server, or other piece of information technology (IT) equipment. In one embodiment, a RMPDU can distribute single phase power from a three phase power source. In some implementations, the RMPDU may have the capacity to distribute additional power to loads, however, the nature of the power connections between the IT equipment and a RMPDU within a rack may be unknown. Therefore, the extent and nature of any RMPDU excess power capacity may also be unknown.

Systems and methods in accordance with at least on embodiment described herein can determine the available power capacity of power supplies in data center racks. In one embodiment, the RMPDU power draw over time per phase can be determined. This power draw and device tolerance data (e.g., device nameplate data, tag data, or burn-in test result data) can be evaluated to determine remaining and used power capacity for each phase of a RMPDU. This information can be displayed to a user via the graphic user interfaces of FIGS. 9A and 9B, together with an indication of when, if, where, or how additional IT equipment can be loaded into a data center rack to draw power from a RMPDU.

In one embodiment, which may utilize the graphical user interface of FIGS. 9A and 9B, a data center includes two racks (e.g., rack 1 and rack 2), with each rack including at least one RMPDU. The racks can be configured for 2N power redundancy with power delivered from two separate power sources to each of the racks. For example, rack 1 can include two RMPDUs connected to a first power source (e.g., "power source α") and two RMPDUs connected to a second power source (e.g., "power source β"). Therefore, in one embodiment a data center can include two racks, each containing four RMPDUs. In one embodiment this can be accomplished by including a plurality of racks (e.g rack 1 and rack 2) in a capacity group and setting a power density of the capacity group to a desired level.

In one embodiment, for each phase of a multi-phase power distribution system, available rack power capacity can be determined by evaluating the difference between the planned average power draw of a rack and the actual measured power draw over time. Available rack power capacity can be determined by evaluating the difference between the planned rack peak power draw and the actual measured power draw over time. For example, a data center may include two racks (e.g., rack 1 and rack 2) with power delivered from two separate sources (power source α and power source β) via two lines (e.g line 1 and line 2) to each of the racks.

In one illustrative embodiment, the maximum expected rack power draw for rack 1 can be 6 kW, and the maximum expected rack power for rack 2 can be 5.5 kW. It is appreciated that these numbers are examples and that total rack power draws for various racks that can be used in data centers varies widely. In one embodiment, the maximum expected rack power draw for a rack includes a sum of corrected nameplate power draw for any IT equipment in a rack that has been included in a power measurement. The corrected nameplate power draw may be the actual nameplate power draw or the nameplate power draw corrected based on measurements or other information, such as changed configurations. Continuing with this illustrative embodiment, both rack 1 and rack 2 can draw power from power source α and power source β via line 1 and line 2. In one embodiment, each line represents a power phase originating from a three phase power source, such as power source α or power source β. This power draw of each rack via each line of each power supply can be measured. For example, four different power draws for rack 1 may be measured, as rack 1 can draw power via line 1 from both power source α and power source β, and via line 2 from both power source α and power source β. In one embodiment, the power drawn by rack 1 may be measured as indicated in Table 1:

TABLE 1

| measured power draw of rack 1 | | | |
| --- | --- | --- | --- |
| rack 1 | line 1 | power source α | 2.0 kW |
| rack 1 | line 1 | power source β | 1.0 kW |
| rack 1 | line 2 | power source α | 1.5 kW |
| rack 1 | line 2 | power source β | 0.5 kW |

In the example illustrated in Table 1, power drawn by rack 1 via line 1 is 2 kW from power source α, and 1 kW from power source β. Power drawn by rack 1 via line 2 is 1.5 kW from power source α and 0.5 kW from power source β. With reference to Table 1, the overall power draw of rack 1 from line 1 is 3.0 kW, (i.e., 2.0 kW+1.0 kW), and the overall power draw of rack 1 from line 2 is 2.0 kW (i.e., 1.5 kW+0.5 kW). Summing these overall power draws together, it is seen that the overall measured power drawn by rack 1 in this example is 5 kW (i.e., 3 kW+2 kW).

Continuing with this illustrative embodiment, where a data center includes two racks, the power drawn by rack 2 may be measured as indicated in Table 2:

TABLE 2 measured power draw of rack 2

| rack 2 | line 1 | power source α | 1.0 kW |
|---|---|---|---|
| rack 2 | line 1 | power source β | 0.5 kW |
| rack 2 | line 2 | power source α | 2.0 kW |
| rack 2 | line 2 | power source β | 0.5 kW |

As illustrated in Table 2, for example, power drawn by rack 2 via line 1 is 1 kW from power source α, and 0.5 kW from power source β. Power drawn by rack 2 via line 2 is 2.0 kW from power source α and 0.5 kW from power source β. With reference to Table 2, the overall power draw of rack 2 from line 1 is 1.5 kW (i.e., 1.0 kW+0.5 kW), and the overall power draw of rack 2 from line 2 is 2.5 kW (i.e., 2.0 kW+0.5 kW). Summing these overall power draws together, it is seen that the overall measured power drawn by rack 2 in this example is 4 kW (i.e., 2.5 kW+1.5 kW).

As stated above, in this illustrative embodiment, the maximum expected rack power draw for rack 1 can be 6 kW, and the maximum expected rack power draw for rack 2 can be 5.5 kW. A power draw factor, which is the ratio of maximum expected power draw to measured power draw (i.e. maximum power draw/measure power draw) can thus be determined. Continuing with this embodiment, the power draw factor of rack $$1 \text{ is } \frac{6}{5}$$

and the power draw factor of rack $$2 \text{ is } \frac{5.5}{4}.$$

As stated above and illustrated in Table 1 and Table 2, in one embodiment, each rack (e.g. rack 1 and rack 2) can include four power draws. A rack with four different power draws may include four different rack mounted power distribution units (RMPDUs). For example, each power source/line combination may include a RMPDU configured to distribute one phase power from a three phase power source to IT equipment of a rack. When a rack includes four lines, each line providing single phase power from two different three phase power sources, there are four possible power source/line combinations, and therefore four RMPDUs. Continuing with the illustrative embodiment of Table 1 and Table 2, an example of the expected peak power draw in each RMPDU for rack 1 is illustrated in Table 3.

With respect to Table 3, reproduced below, the expected peak power draw is based on the sum of the products of the respective power draw factors and the expected peak power drawn through the lines from power sources of rack 1. It should be appreciated that the repetitive nature of these tables and equations results from the 2N redundancy configuration of this example. Power may be drawn from only one, or more than one power source at the same time. Power may, but need not, be drawn by a plurality of power sources simultaneously. Other configurations can result in different expected peak power draw data. For example, with reference to Table 1, the expected peak power draw of the rack mounted power distribution units is indicated in equations 1-4.

$$RMPDU1\alpha = \left(\frac{6}{5} * 2.0 \text{ kW}\right) + \left(\frac{6}{5} * 1.0 \text{ kW}\right) = \frac{18}{5} = 3.6 \text{ kW} \quad (1)$$

$$RMPDU1\beta = \left(\frac{6}{5} * 2.0 \text{ kW}\right) + \left(\frac{6}{5} * 1.0 \text{ kW}\right) = \frac{18}{5} = 3.6 \text{ kW} \quad (2)$$

$$RMPDU2\alpha = \left(\frac{6}{5} * 1.5 \text{ kW}\right) + \left(\frac{6}{5} * 0.5 \text{ kW}\right) = \frac{24}{10} = 2.4 \text{ kW} \quad (3)$$

$$RMPDU2\beta = \left(\frac{6}{5} * 1.5 \text{ kW}\right) + \left(\frac{6}{5} * 0.5 \text{ kW}\right) = \frac{24}{10} = 2.4 \text{ kW} \quad (4)$$

TABLE 3 expected peak power draw of rack 1

| rack 1 | line 1 | power source α | RMPDU 1α | 3.6 kW |
|---|---|---|---|---|
| rack 1 | line 1 | power source β | RMPDU 1β | 3.6 kW |
| rack 1 | line 2 | power source α | RMPDU 2α | 2.4 kW |
| rack 1 | line 2 | power source β | RMPDU 2 β | 2.4 kW |

As can be seen from equations 1-4, in this example the expected peak power drawn by line 1 of rack 1 is 3.6 kW and the expected peak power drawn by line 2 of rack 1 is 2.4 kW, regardless of the power source (e.g., α or β). 3.6 kW+2.4 kW=6 kW, which, as stated previously, is the maximum power draw for rack 1 in this example.

Continuing with this illustrative embodiment, an example of the expected peak power draw for rack 2 is illustrated in Table 4, reproduced below. With respect to Table 4, the expected peak power draw is the sum of the products of the respective power draw factors and the measured power draws through the lines and power sources of rack 2. For example, with reference to Table 2, the expected peak power drawn by the rack mounted power distribution units is indicated in equations 5-8.

$$RMPDU2\alpha = \left(\frac{5.5}{4} * 1.0 \text{ kW}\right) + \left(\frac{5.5}{4} * 0.5 \text{ kW}\right) = \frac{16.5}{8} = 2.06 \text{ kW} \quad (5)$$

$$RMPDU2\beta = \left(\frac{5.5}{4} * 1.0 \text{ kW}\right) + \left(\frac{5.5}{4} * 0.5 \text{ kW}\right) = \frac{16.5}{8} = 2.06 \text{ kW} \quad (6)$$

$$RMPDU2\alpha = \left(\frac{5.5}{4} * 2.0 \text{ kW}\right) + \left(\frac{5.5}{4} * 0.5 \text{ kW}\right) = \frac{27.5}{8} = 3.44 \text{ kW} \quad (7)$$

$$RMPDU2\beta = \left(\frac{5.5}{4} * 2.0 \text{ kW}\right) + \left(\frac{5.5}{4} * 0.5 \text{ kW}\right) = \frac{27.5}{8} = 3.44 \text{ kW} \quad (8)$$

TABLE 4 expected peak power draw of rack 2

| rack 2 | line 1 | power source α | RMPDU 1α | 2.06 kW |
|---|---|---|---|---|
| rack 2 | line 1 | power source β | RMPDU 1β | 2.06 kW |
| rack 2 | line 2 | power source α | RMPDU 2α | 3.44 kW |
| rack 2 | line 2 | power source β | RMPDU 2 β | 3.44 kW |

As can be seen from equations 5-8, in this example the expected peak power drawn by line 1 of rack 2 is 2.06 kW and the expected peak power drawn by line 2 of rack 2 is 3.44 kW, regardless of the power source (e.g., α or β). 2.06 kW+3.44 kW=5.5 kW, which, as stated previously, is the maximum power draw for rack 2 in this example.

Continuing with this illustrative embodiment, rack 1 may have a planned average power draw of, for example, 3.75 kW for both lines 1 and 2. This number is exemplary and can vary. In one embodiment, a planned average power draw is generally a predetermined average power draw of a plurality of racks that are included in one or more data centers. As indicated in Table 3, the expected peak power draw of rack 1 was determined to be 3.6 kW for line 1. This leaves an available average rack capacity that is the difference of the planned average power draw and the expected peak power draw, e.g., 3.75 kW−3.6 kW=0.15 kW for line 1 of rack 1. Analogously, the expected peak power draw of rack 1 was determined to be 2.4 kW for line 2. This leaves an available rack capacity of 3.75 kW−2.4 kW=1.35 kW for line 2 of rack 1. The available rack capacity for rack 1 is the sum of the available rack capacity for line 1 of rack 1 and the available rack capacity for line 2 of rack 1, i.e., 0.15 kW+1.35 kW=1.5 kW.

In this illustrative embodiment, rack 2 may also have a planned average power draw of, for example, 3.75 kW for both lines 1 and 2. As indicated in Table 4, the expected peak power draw of rack 2 was determined to be 2.06 kW for line 1. This leaves an available rack capacity of 3.75 kW−2.06 kW=1.69 kW for line 1 of rack 2. Analogously, the expected peak power draw of rack 2 was determined to be 3.44 kW for line 2. This leaves an available rack capacity of 3.75 kW−3.44 kW=0.31 kW for line 2 of rack 2. The available rack capacity for rack 2 is the sum of the available rack capacity for line 1 and the available rack capacity for line 2 of rack 2, i.e., 1.69 kW+0.31 kW=2.0 kW.

It should be appreciated that the total capacity of line 1 is, in this embodiment, the sum of the capacities of line 1 for rack 1 and rack 2. The total capacity of line 1 is therefore 0.15 kW+1.69 kW=1.84 kW in this example. Analogously, the total capacity of line 2 is the sum of the capacities of line 2 for rack 1 and rack 2, i.e., 1.35 kW+0.31 kW=1.66 kW in this example where the planned average power draw of rack 1 is 3.75 kW. In one embodiment, a rack cluster (e.g., group of racks) may collectively remain within a planned average power draw, and individual racks may exceed this average value.

In one embodiment, maximum available capacity may be based on a planned rack peak power draw value. For example, the planned rack peak power draw value may be a predetermined value of 6 kW for lines 1 and 2. With a peak power draw of 6 kW, the maximum available rack capacity for line 1 of rack 1 is, in this illustrative embodiment, the difference between the peak power draw and the expected peak power drawn by line 1 of rack 1, e.g., 6 kW−3.6 kW=2.4 kW (see Table 3). However, the available rack capacity is, in one embodiment, the lesser of the difference between; 1) the planned average power draw and the expected peak power draw; and 2) the planned rack peak power draw and the expected peak power draw. For example, the maximum available rack capacity of 2.4 kW for rack 1, line 1, is greater than the existing capacity of line 1, which, as stated above, is 1.84 kW in this illustrative embodiment. The maximum available rack capacity for rack 1, line 1 is the existing capacity of 1.84 kW. In this example, 1.84 kW is available via line 1 to handle the addition of any IT equipment to at least one of rack 1.

Analogously, the maximum available capacity for line 2 of rack 1 may be determined by calculating the difference between the peak power draw and the expected peak power of line 2 of rack 1. In the above-illustrated embodiment, and with respect to Table 4, this would be 6 kW−2.4 kW=3.6 kW. Although this calculation indicates that the maximum available rack capacity could be 3.6 kW, in this example, the currently available total capacity for line 2 is 1.66 kW, an amount that in one embodiment cannot be exceeded. Therefore, the total line capacity for line 2 is 1.66 kW in this example.

It should be appreciated that, in this illustrated embodiment, the maximum available rack capacity for rack 1 can be 2.4 kW and 3.6 kW, respectively, for lines 1 and 2. These maximum capacity values indicate the power limits that should be respected in order to, for example, avoid tripping a circuit breaker or otherwise dropping a load. However, as demonstrated in this illustrative embodiment, other facts may prevent application of the maximum capacity values. For example, when the available total line capacity (e.g., 1.84 kW for line 1 and 1.66 kW for line 2) is less than the maximum calculated available capacity of a rack (e.g., 2.4 kW for line 1 and 3.6 kW for line 2 of rack 1) the total line capacity controls and in one embodiment is not exceeded.

The maximum available rack capacity of rack two may also be determined and, in one embodiment, may be limited by available total line capacities. For example and with reference to the above-illustrated embodiment and Table 4, the maximum available capacity for rack 2, line 1 may be 6 kW−2.06 kW=3.94 kW. However, in this example the total line capacity of line 1 is limited to 1.84 kW, making 1.84 kW the maximum amount of power that can be delivered to rack 2 via line 1 in this example. In one embodiment where, for example the total line capacity of line 1 is, for example 4.1 kW, the entire maximum available rack capacity for rack 2, line 1 (e.g., 3.94 kW) may be applied.

The maximum available capacity for rack 2, line 2 may be similarly determined. With reference to Table 4, in one embodiment the maximum available capacity for rack 2, line 2 may be 6 kW−3.44 kW=2.56 kW. This value, however, is greater than the total line capacity of line 2, which is in this example 1.66 kW. As a result the maximum available capacity of rack 2 line 2 can be limited by the overall line capacity of line 2, which is 1.66 kW. In various embodiments, at least a portion of the maximum available capacity of a line can be applied to any rack, up to a limit of a total capacity of that line.

In one embodiment, the knowledge of the distribution of available capacity for each of the available phases (e.g., lines) in each rack can be used to find available locations in racks and RMPDUs where sufficient power can be available to support additional IT equipment. For example, based on an evaluation of power draw, tags, nameplates, burn-in testing, infrastructure redundancy, and an evaluation of available line and rack capacity, the systems and methods disclosed herein can provide a recommendation as to where to place the additional IT equipment (e.g., a server) as well as a RMPDU and power phase (e.g., line 1 or line 2) to connect the server to.

With respect to the embodiment illustrated above, and with reference to Tables 1-4 and equations 1-8, in one embodiment a user can add a 1 kW server to one of the first rack and the second rack. As described above, the maximum available capacity for rack 2, line 1 may be 3.94 kW, which in this example indicates a greater potential capacity than any of the other rack/line combinations. In this example, aspects and embodiments disclosed herein may provide an indication that a new server is to be connected to line 1 of rack 2.

In one embodiment, a recommendation can be made as to where and how to insert an additional IT device into a rack. For example, a user may be instructed to insert a 1 kW server into line 1 of rack 2 based at least in part on the maximum available capacity of that rack and line. As in one embodiment the 1 kW server may not have been connected to rack 2 at line 1, the power characteristics of the server may have not been incorporated into the calculation of equations 1-8 above. In one embodiment the power characteristics of the 1 kW server can be considered, and new calculations performed to redetermine capacity in view of the additional 1 kW server.

In one embodiment, to add a 1 kW server to, for example, rack 2, line 1, a 1 kW load can be added to equations 5 and 6 as indicated below in Table 5 and equations 9 and 10.

$$RMPDU2\alpha = \left(\frac{5.5}{4} * 1.0 \text{ kW}\right) + \left(\frac{5.5}{4} * 0.5 \text{ kW}\right) + 1 \text{ kW} \quad (9)$$
$$= \frac{24.5}{8}$$
$$= 3.06 \text{ kW}$$

$$RMPDU2\beta = \left(\frac{5.5}{4} * 1.0 \text{ kW}\right) + \left(\frac{5.5}{4} * 0.5 \text{ kW}\right) + 1 \text{ kW} \quad (10)$$
$$= \frac{24.5}{8}$$
$$= 3.06 \text{ kW}$$

In this illustrative embodiment, equations 7 and 8 remain unchanged as they represent line 2 of rack 2, which does not, in this embodiment, receive the additional 1 kW load. Table 5, reproduced below, updates Table 4 to reflect this additional load added to line 1 of rack 2.

TABLE 5 expected peak power draw of rack 2

| rack 2 | line 1 | power source α | RMPDU 1α | 2.06 kW + 1 kW = 3.06 kW |
| rack 2 | line 1 | power source β | RMPDU 1β | 2.06 kW + 1 kW = 3.06 kW |
| rack 2 | line 2 | power source α | RMPDU 2α | 3.44 kW |
| rack 2 | line 2 | power source β | RMPDU 2 β | 3.44 kW |

Continuing with this illustrative embodiment, the additional 1 kW load changes the available rack capacity determination for line 1 of rack 2. For example and as described above, where the planned average power draw is 3.75 kW, the available rack capacity for line 1 of rack 2 was determined to be 3.75 kW−2.06 kW=1.69 kW (see equations 5 and 6). Due to the new 1 kW load addition to rack 2, line 1, the available rack capacity for rack 2, line 1 drops to 3.75 kW−3.06 kW=0.69 kW (see equations 9 and 10). In this example, the available rack capacity for line 2, rack 2 remains the same at 3.75 kW−3.44 kW=0.31 kW. As a result, the available rack capacity for rack 2 drops from 2.0 kW (i.e.,1.69 kW+0.31 kW=2.0 kW) to 1 kW (i.e., 0.69 kW+0.31 kW=1.0 kW). Analogously, in this illustrative embodiment, the new 1 kW load to rack 2, line 1 drops the total capacity of line 1 from 0.15 kW+1.69 kW=1.84 kW to 0.15 kW+0.69 kW=0.84 kW.

As illustrated above, with a planned rack average power draw of 3.75 kW per line, and a planned rack peak power draw of 6 kW per line, the maximum available rack capacities remain as indicated in Table 6, produced below.

TABLE 6 maximum available rack capacity

| rack 1 | line 1 | 6.0 kW − 3.6 kW = 2.4 kW |
| rack 1 | line 2 | 6.0 kW − 2.4 kW = 3.6 kW |
| rack 2 | line 1 | 6.0 kW − 2.06 kW = 3.94 kW |
| rack 2 | line 2 | 6.0 kW − 3.44 kW = 2.56 kW |

In one embodiment, these maximum available capacities can be limited by the available total line capacities. Because the 1 kW server is, in this example, being applied to line 1, the total capacity of line 2 remains unchanged at 1.35 kW+0.31 kW=1.66 kW, and the total capacity of line 1 drops to 0.15 kW+0.69 kW=0.84 kW. Because in this example the total line capacities of line 1 and line 2 are less than the maximum available rack capacities of Table 6, the total line capacities limit power the amount of power distribution to the racks as shown in Table 7.

TABLE 7 maximum available rack capacity with one additional 1 kW load

| rack 1 | line 1 | rack 1, line 1 capacity of 2.4 kW but limited to line 1 capacity of 0.84 kW |
| rack 1 | line 2 | rack 1, line 2 capacity of 3.6 kW but limited to line 2 capacity of 1.66 kW |
| rack 2 | line 1 | rack 2, line 1 capacity of 3.94 kW but limited to line 1 capacity of 0.84 kW |
| rack 2 | line 2 | rack 2, line 2 capacity of 2.56 kW but limited to line 2 capacity of 1.66 kW |

It should be appreciated that in this illustrative embodiment where a 1 kW server is added to a data center or rack cluster, a determination as to where (e.g., rack 1) and how (e.g., to line 1) to insert the 1 kW server can be made at least in part due to an evaluation of rack and line capacities.

In one embodiment, a second IT device, such as another 1 kW server, can be added to a data center of the above-illustrated embodiment. With reference to Table 7, line 1, which is limited to a capacity of 0.84 kW, cannot carry a full 1 kW load. However, line 2, with a capacity of 1.66 kW, has sufficient capacity to carry a 1 kW load. For example, and with reference to Table 7, this second 1 kW load can be assigned to rack 1, line 2. In one embodiment, the power data from the first and second additional 1 kW loads can be evaluated to recalibrate the available capacities of lines and racks of a data center, without the need to physically install and run either of the first and second additional 1 kW loads. For example, the new load data can revise Table 3 as indicated below in Table 8.

TABLE 8 expected peak power draw of rack 1

| rack 1 | line 1 | power source α | RMPDU 1α | 3.6 kW |
| rack 1 | line 1 | power source β | RMPDU 1β | 3.6 kW |
| rack 1 | line 2 | power source α | RMPDU 2α | 2.4 kW + 1 kW = 3.4 kW |
| rack 1 | line 2 | power source β | RMPDU 2 β | 2.4 kW + 1 kW = 3.4 kW |

The addition of a second additional 1 kW load is also reflected in equations 11 and 12 below, which supplement equations 3 and 4 to account for the second 1 kW load.

$$RMPDU2\alpha = \left(\frac{6}{5} * 1.5 \text{ kW}\right) + \left(\frac{6}{5} * 0.5 \text{ kW}\right) + 1.0 \text{ kW} \quad (11)$$
$$= \frac{34}{10}$$
$$= 3.4 \text{ kW}$$

$$RMPDU2\beta = \left(\frac{6}{5} * 1.5 \text{ kW}\right) + \left(\frac{6}{5} * 0.5 \text{ kW}\right) + 1.0 \text{ kW} \quad (12)$$
$$= \frac{34}{10}$$
$$= 3.4 \text{ kW}$$

In one embodiment, a 1 kW load has been added to rack 1, line 2 and where another 1 kW load has been added to rack 2, line 1, the expected peak power draw can be illustrated by combining portions of Table 5 and Table 8, as seen in Table 9.

TABLE 9 expected peak power draw with two additional 1 kW loads

| rack 1 | line 1 | RMPDU 1α | 3.6 kW |
| rack 1 | line 2 | RMPDU 1β | 2.4 kW + 1 kW = 3.4 kW |
| rack 2 | line 1 | RMPDU 2α | 2.06 kW + 1 kW = 3.06 kW |
| rack 2 | line 2 | RMPDU 2 β | 3.44 kW |

In this illustrative embodiment, rack 1 has the planned average power draw of 3.75 kW for both lines 1 and 2. With reference to Table 9, the differences between the planned average power draw of 3.75 kW and the expected peak power draws of 3.6 kW, 3.4 kW, 3.06 kW, and 3.44 kW result in available rack capacities of 0.15 kW for line 1 of rack 1, 0.35 kW for line 2 of rack 1, 0.69 kW for line 1 of rack 2, and 0.31 kW for line 2 of rack 2. It should be appreciated that the available rack capacities in this example are 0.15 kW+0.35 kW=0.5 kW for rack 1 and 0.69 kW+0.31 kW=1.0 kW for rack 2. It should be further appreciated that the total line capacities in this embodiment are 0.15 kW+0.69 kW=0.84 kW for line 1 and 0.35 kW+0.31 kW=0.66 kW for line 2. Because in this example the total line capacities of line 1 and line 2 are less than the maximum available rack capacities, the total line capacities limit power the amount of power distribution to the racks as shown in Table 10.

TABLE 10 maximum available rack capacity with two additional 1 kW loads

| rack 1 | line 1 | rack 1, line 1 capacity of 2.4 kW but limited to line 1 capacity of 0.84 kW |
| rack 1 | line 2 | rack 1, line 2 capacity of 2.6 kW but limited to line 2 capacity of 0.66 kW |
| rack 2 | line 1 | rack 2, line 1 capacity of 3.94 kW but limited to line 1 capacity of 0.84 kW |
| rack 2 | line 2 | rack 2, line 2 capacity of 2.56 kW but limited to line 2 capacity of 0.66 kW |

The embodiments included in the Tables and equations herein depict examples of data center power distribution where IT equipment can be added to particular racks connected to power sources of a data center in order to efficiently allocate resources and integrate new IT equipment into existing data centers or power distribution systems. It should be appreciated that the specific numbers and tolerances of these embodiments and examples are not limiting. Other devices can have wattage requirements that are different from the particular numbers used herein. It should be further appreciated that the power measurements and calculations disclosed herein indicate which phase of a power source has sufficient capacity to supply a new device. As such, the systems and methods disclosed herein make it possible to calculate the distribution of used and available power capacity in any of an uninterruptable power supply, power distribution unit, and rack mounted power distribution unit in one or more three phase power systems deployed in a data center or other setting.

In one embodiment, the actual distribution of loads between phases need not be known. For example, calculations herein may be based on measured peak power draw per phase for a three phase power system, as reported by RMPDUs via a management system combined with a computer model of power and phase connections between any of power distribution units, uninterruptible power supplies, rack mounted power distribution units, and IT equipment. In one embodiment, IT equipment has a known expected peak power, (e.g., printed on a nameplate) and a known location in a data center. This data can be sufficient for the calculations and operations disclosed herein, even in the absence of known power connection data between the IT equipment, and any RMPDUs. For example, where these details are unknown, relative distribution of measured peak power draw between phases of RMPDUs in a rack may be used to calculate the distribution of average or expected peak power draw of installed IT equipment. In one embodiment, the available capacity per phase per RMPDU can be calculated based on the calculated distribution of expected peak power draw. Capacity calculations combining measured data with nameplate or other tag values may be used in conjunction with RMPDU measured data to balance power phases in data centers.

In one embodiment, via a user interface, a user can select or input any of a desired redundancy, tag values, physical dimensions, power requirements such as expected peak power draw, number of phases, or voltage, and based on this input, aspects disclosed herein can present one or more of recommended locations and recommended connections. In one embodiment a user may be presented with a plurality of acceptable locations and connections.

Various embodiments according to the invention may be implemented on one or more computer systems as discussed above. For example, system 200 may be implemented in a single computer system or in multiple computer systems. These computer systems may be, for example, general-purpose computers such as those based on Intel PENTIUM-type processor, Motorola PowerPC, Sun UltraSPARC, Hewlett-Packard PA-RISC processors, or any other type of processor.

Figure 12:
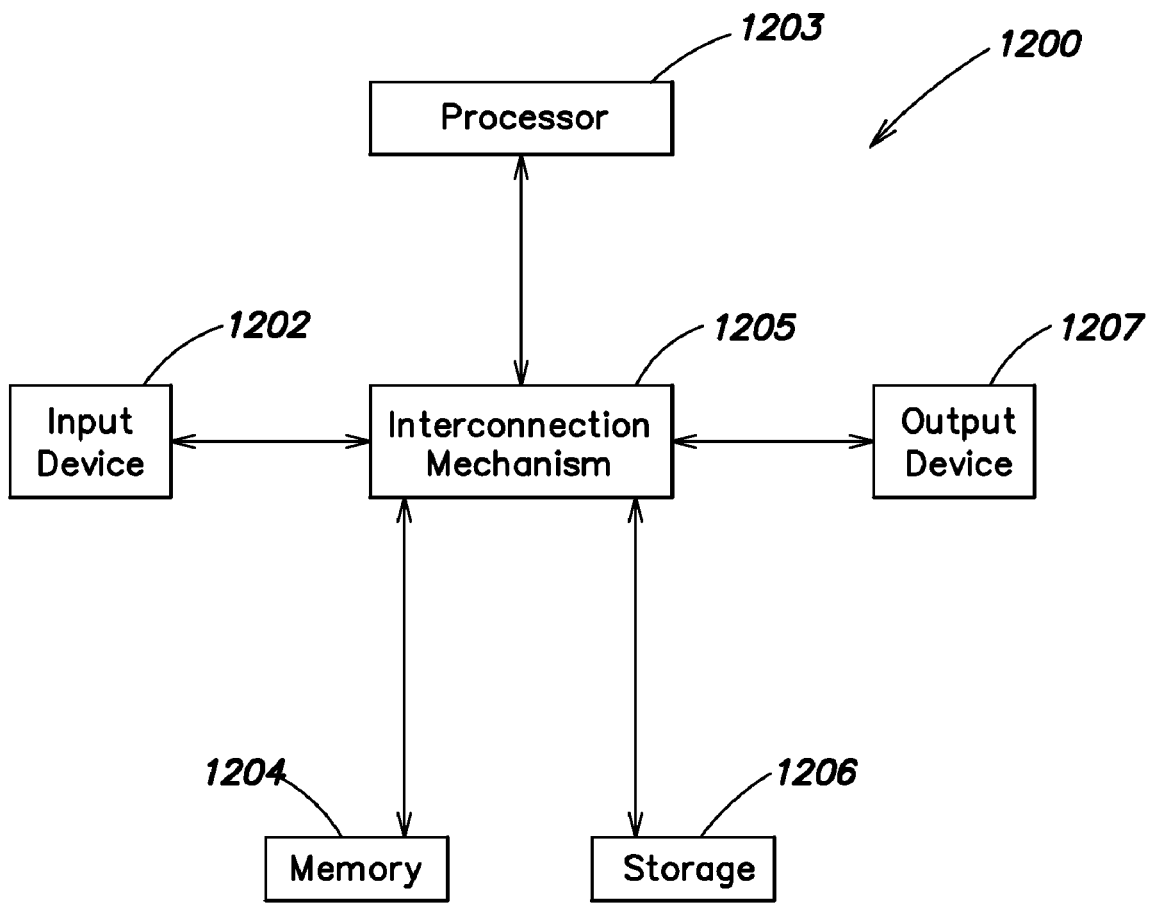
FIG. 12 is a functional block diagram of a computer system that may be used in embodiments of the invention.

For example, various aspects of the invention may be implemented as specialized software executing in a general-purpose computer system 1200 such as that shown in FIG. 12. The computer system 1200 may include a processor 1203 connected to one or more memory devices 1204, such as a disk drive, memory, or other device for storing data. Memory 1204 is typically used for storing programs and data during operation of the computer system 1200. The computer system 1200 may also include a storage system 1206 that provides additional storage capacity. Components of computer system 1200 may be coupled by an interconnection mechanism 1205, which may include one or more busses (e.g., between components that are integrated within a same machine) and/or a network (e.g., between components that reside on separate discrete machines). The interconnection mechanism 1205 enables communications (e.g., data, instructions) to be exchanged between system components of system 1200.

Computer system 1200 also includes one or more input devices 1202, for example, a keyboard, mouse, trackball, microphone, touch screen, and one or more output devices 1207, for example, a printing device, display screen, speaker. In addition, computer system 1200 may contain one or more interfaces (not shown) that connect computer system 1200 to a communication network (in addition or as an alternative to the interconnection mechanism 1205).

Figure 13:
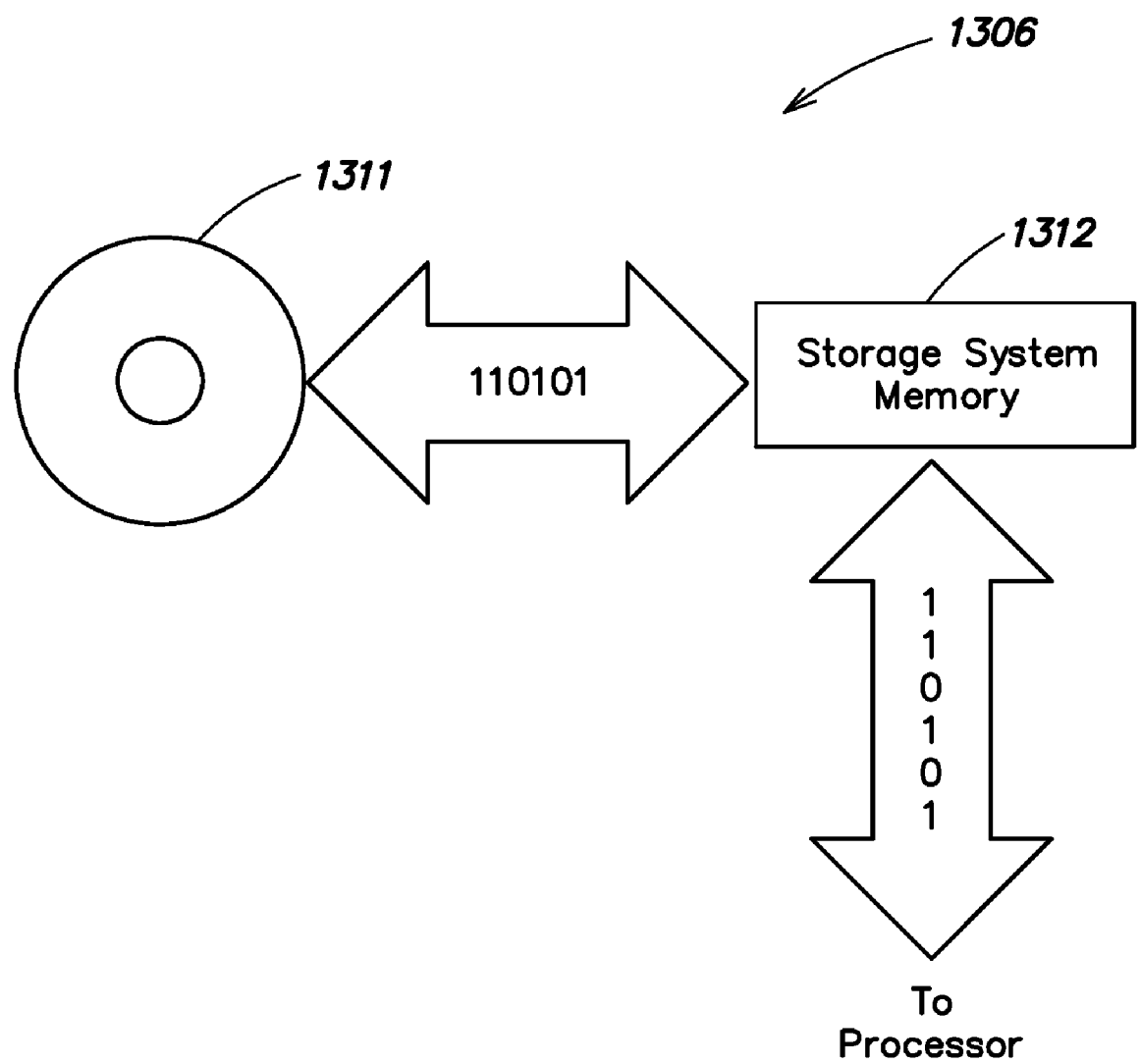
FIG. 13 is a functional block diagram of a storage system that may be used with the computer system of FIG. 12.

The storage system 1206, shown in greater detail in FIG. 13, typically includes a computer readable and writeable nonvolatile recording medium 1311 in which signals are stored that define a program to be executed by the processor or information stored on or in the medium 1311 to be processed by the program to perform one or more functions associated with embodiments described herein. The medium may, for example, be a disk or flash memory. Typically, in operation, the processor causes data to be read from the nonvolatile recording medium 1311 into another memory 1312 that allows for faster access to the information by the processor than does the medium 1311. This memory 1312 is typically a volatile, random access memory such as a dynamic random access memory (DRAM) or static memory (SRAM). It may be located in storage system 1306, as shown, or in memory system 1204. The processor 1203 generally manipulates the data within the integrated circuit memory 1204, 1312 and then copies the data to the medium 1311 after processing is completed. A variety of mechanisms are known for managing data movement between the medium 1311 and the integrated circuit memory element 1204, 1312, and the invention is not limited thereto. The invention is not limited to a particular memory system 1204 or storage system 1206.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1200 is shown by way of example as one type of computer system upon which various aspects of the invention may be practiced, it should be appreciated that aspects of the invention are not limited to being implemented on the computer system as shown in FIG. 12. Various aspects of the invention may be practiced on one or more computers having a different architecture or components shown in FIG. 12. Further, where functions or processes of embodiments of the invention are described herein (or in the claims) as being performed on a processor or controller, such description is intended to include systems that use more than one processor or controller to perform the functions.

Computer system 1200 may be a general-purpose computer system that is programmable using a high-level computer programming language. Computer system 1200 may be also implemented using specially programmed, special purpose hardware. In computer system 1200, processor 1203 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP or Vista operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that embodiments of the invention are not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present invention.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Embodiments of a systems and methods described above are generally described for use in relatively large data centers having numerous equipment racks, however, embodiments of the invention may also be used with smaller data centers and with facilities other than data centers.

In embodiments of the present invention discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for determining available power capacity of a phase of a power supply, the method comprising:
   metering a power draw per phase of a power supply at a data center rack;
   calculating an average power draw per phase of the power supply; and
   calculating available power capacity per phase of the power supply at the data center rack based on the average power draw and expected power draw data corresponding to data center equipment coupled to the power supply.

2. The method of claim 1 wherein the average power draw is the average peak power draw.

3. The method of claim 1 wherein the power supply is a power distribution unit.

4. The method of claim 1 wherein the power supply is an uninterruptible power supply.

5. The method of claim 1 wherein the power supply is a polyphase power supply.

6. The method of claim 1 further comprising:
adding at least one element of data center equipment to the data center rack; and
providing power from the available power capacity to the at least one element of data center equipment.

7. The method of claim 1, wherein calculating available power capacity per phase is based on an average peak power draw and the expected power draw data corresponding to data center equipment coupled to the power supply.

8. The method of claim 1 wherein the average peak power draw is a running average.

9. The method of claim 1 wherein the expected power draw data corresponding to data center equipment is based on nameplate information for the data center equipment.

10. The method of claim 1 wherein the expected power draw data corresponding to data center equipment is corrected nameplate information.

11. A computer readable medium having stored thereon sequences of instruction including instructions that will cause a processor to:
control a power meter to meter a power draw per phase of a power supply at a data center rack;
calculate an average peak power draw per phase of the power supply; and
calculate available power capacity per phase of the power supply at the data center rack based on the average peak power draw and expected power draw data corresponding to data center equipment coupled to the power supply.

12. A method for managing data center equipment, the method comprising:
determining available power capacity of a phase of a power supply in a data center rack;
presenting, to a user of a computer system, an interactive representation of a layout of a data center room that includes the data center rack;
receiving, from the user, identification information for at least one element of data center equipment to be placed in the data room; and
presenting, to the user, a representation of an optimal location in the data center rack to connect the at least one element of data center equipment with the phase of the power supply based on the determination of the available power capacity of the phase of the power supply at the data center rack.

13. The method of claim 12 wherein determining available power capacity includes:
metering a power draw per phase of the power supply
calculating an average power draw per phase of the power supply; and
determining available power capacity per phase of the power supply based on the average power draw and expected power draw data corresponding to data center equipment coupled to the power supply.

14. The method of claim 13, wherein the average power draw is an average peak power draw.

15. The method of claim 12 wherein the identification information for the at least one element includes power draw, nameplate information, infrastructure redundancy, or tagged information.

16. The method of claim 12, comprising:
identifying the optimal location based at least in part on at least one other available data center resource.

17. The method of claim 16 wherein the at least one other available data center resource is cooling capacity, physical space availability, weight support, remote equipment control capability, physical and logical security, or physical and logical network connectivity.

18. The method of claim 12, comprising:
identifying the optimal location based at least in part on power draw, nameplate information, infrastructure redundancy, or tagged information of the at least one element of data center equipment.

19. A computer readable medium having stored thereon sequences of instruction including instructions that will cause a processor to:
determine available power capacity of a phase of a power supply in a data center rack;
present, to a user of a computer system, an interactive representation of a layout of a data center room that includes the data center rack;
receive, from the user, identification information of the at least one element of data center equipment to be placed in the data room; and
present, to the user, a representation of an optimal location at the data center rack to connect the at least one element of data center equipment with the phase of the power supply based on the determination of available power capacity of the phase.

20. A system for managing data center equipment, the system comprising:
a memory configured to store power draw data corresponding to data center equipment;
a power meter configured to measure a power draw per phase of a power supply; and
a user interface configured to provide an interactive representation of a layout of a data center room, and to receive identification information for at least one element of data center equipment to be placed in the data room; and
a processor coupled to the memory and configured to calculate an average peak power draw per phase of a power supply, to calculate available power capacity per phase of the power supply based on the average peak power draw and expected power draw data corresponding to data center equipment coupled to the power supply, and to calculate an optimal location in the data center room to connect the at least one element of data center equipment with a phase of the power supply, based on available power capacity of the phase;
wherein the user interface is further configured to display a representation of the optimal location.

21. The system of claim 20 wherein the user interface is located on at least one element of data center equipment.

22. The system of claim 20 wherein the user interface is located on a handheld device.

* * * * *